(12) United States Patent
Buscema

(10) Patent No.: US 7,792,869 B2
(45) Date of Patent: Sep. 7, 2010

(54) METHOD, COMPUTER PROGRAM AND COMPUTER READABLE MEANS FOR PROJECTING DATA FROM A MULTIDIMENSIONAL SPACE INTO A SPACE HAVING FEWER DIMENSIONS AND TO CARRY OUT A COGNITIVE ANALYSIS ON SAID DATA

(75) Inventor: Paolo Massimo Buscema, Rome (IT)

(73) Assignee: Semeion, Rome (IT)

( * ) Notice: Subject to any disclaimer, the term of this patent is extended or adjusted under 35 U.S.C. 154(b) by 505 days.

(21) Appl. No.: 10/563,409

(22) PCT Filed: Jun. 22, 2004

(86) PCT No.: PCT/EP2004/051190

§ 371 (c)(1),
(2), (4) Date: Oct. 26, 2006

(87) PCT Pub. No.: WO2005/008596

PCT Pub. Date: Jan. 27, 2005

(65) Prior Publication Data

US 2007/0100880 A1    May 3, 2007

(30) Foreign Application Priority Data

Jul. 1, 2003   (EP) .................................. 03425436

(51) Int. Cl.
*G06F 17/30* (2006.01)
(52) U.S. Cl. ........................................ 707/802; 706/13
(58) Field of Classification Search ........................ None
See application file for complete search history.

(56) References Cited

U.S. PATENT DOCUMENTS

| 5,581,259 | A | * | 12/1996 | Schipper | 342/451 |
| 5,680,331 | A | * | 10/1997 | Blaney et al. | 703/11 |
| 2001/0020137 | A1 | * | 9/2001 | Granger | 600/544 |
| 2002/0091655 | A1 | * | 7/2002 | Agrafiotis et al. | 706/26 |
| 2003/0225718 | A1 | * | 12/2003 | Shmulevich et al. | 706/46 |
| 2004/0088341 | A1 | * | 5/2004 | Lee | 708/100 |
| 2004/0243593 | A1 | * | 12/2004 | Stolte et al. | 707/100 |
| 2004/0249831 | A1 | * | 12/2004 | Fagin et al. | 707/100 |

* cited by examiner

*Primary Examiner*—Neveen Abel Jalil
*Assistant Examiner*—Son T Hoang
(74) *Attorney, Agent, or Firm*—Themis Law

(57) ABSTRACT

An algorithm for projecting information data belonging to a multidimensional space into a space having fewer dimensions, a method for the cognitive analysis of multidimensional information data based on said algorithm, and a program comprising said algorithm stored on a recordable support. An algorithm for projecting information data belonging to a multidimensional space into a space having fewer dimensions including the following steps: Providing a database of N-dimensional data in the form of records having a certain number of variables; Defining a metric function for calculating a distance between each record of the database; Calculating a matrix of distances between each record of the database by means of the metric function defined at the previous step; Defining a n−1 dimensional space in which each record is defined by n−1 coordinates; Calculating the n−1 coordinates of each record in the n−1 dimensional space by means of an evolutionary algorithm; Defining as the best projection of the records onto the n−1 dimensional space the projection in which the distance matrix of the records in the n−1 dimensional space best fits or has minimum differences with the distance matrix of the records calculated in the n-dimensional space. The method and the program apply the aforementioned algorithm.

61 Claims, 15 Drawing Sheets

Example (1)

|  | Alessandria | Ancona | Aosta | Arezzo | Ascoli | Asti | Avellino | Bari | Belluno | Benevento |
|---|---|---|---|---|---|---|---|---|---|---|
| Alessandria | 0 | | | | | | | | | |
| Ancona | 465 | 0 | | | | | | | | |
| Aosta | 165 | 617 | 0 | | | | | | | |
| Arezzo | 389 | 192 | 550 | 0 | | | | | | |
| Ascoli | 576 | 122 | 728 | 249 | 0 | | | | | |
| Asti | 37 | 491 | 159 | 420 | 602 | 0 | | | | |
| Avellino | 824 | 437 | 985 | 456 | 365 | 855 | 0 | | | |
| Bari | 919 | 465 | 1071 | 661 | 400 | 945 | 208 | 0 | | |
| Belluno | 441 | 454 | 534 | 426 | 565 | 468 | 861 | 908 | 0 | |
| Benevento | 805 | 395 | 966 | 431 | 323 | 836 | 42 | 197 | 842 | 0 |

(HIDDEN on left side, Hidden on top)

Highway Distances in a geographic space between 10 Italian Cities (in Km)
Every highway has three types of alteration in a 2D Euclidean space:

1) A <u>longitudinal alteration</u>
2) An <u>altitude alteration</u>:
3) A <u>structural alteration</u>

Fig. 3

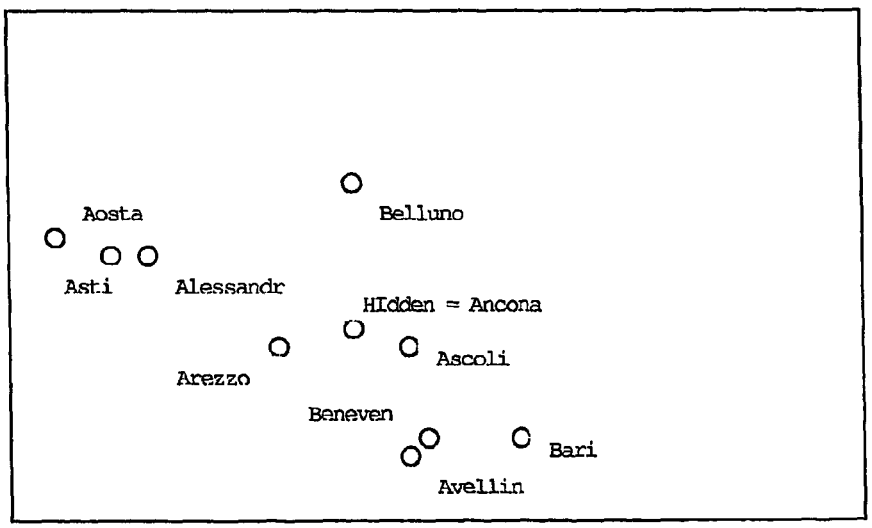

Fig. 4

Example (2)

|  | LA | NY | BOSTON | DETROIT | BUFFALO | PITTSBURG | CHICAGO | SAINT_LOUIS | CINCINNATI | DALLAS | ATLANTA | MEMPHIS |
|---|---|---|---|---|---|---|---|---|---|---|---|---|
| LA | 0 | | | | | | | | | | | |
| NY | 5600 | 0 | | | | | | | | | | |
| BOSTON | 6109 | 509 | 0 | | | | | | | | | |
| DETROIT | 4582 | 1145 | 1527 | 0 | | | | | | | | |
| BUFFALO | 5091 | 764 | 1018 | 509 | 0 | | | | | | | |
| PITTSBURG | 4836 | 764 | 1145 | 509 | 382 | 0 | | | | | | |
| CHICAGO | 4073 | 1655 | 2036 | 509 | 1018 | 891 | 0 | | | | | |
| SAINT_LOUIS | 3564 | 2036 | 2418 | 1018 | 1527 | 1273 | 636 | 0 | | | | |
| CINCINNATI | 4327 | 1273 | 1655 | 382 | 764 | 509 | 509 | 764 | 0 | | | |
| DALLAS | 2800 | 2927 | 3436 | 2036 | 2545 | 2291 | 1655 | 1018 | 1782 | 0 | | |
| ATLANTA | 4327 | 1527 | 2036 | 1145 | 1400 | 1018 | 1145 | 1018 | 764 | 1527 | 0 | |
| MEMPHIS | 3564 | 2164 | 2545 | 1273 | 1782 | 1400 | 1018 | 382 | 891 | 891 | 764 | 0 |

Flight Distances in a geographic space between 12 USA Cities (in miles)
Every air route has three types of alteration in a 2D Euclidean space:

1) A <u>longitudinal alteration</u>
2) An <u>altitude alteration</u>:
3) A <u>structural alteration</u>

Fig. 5

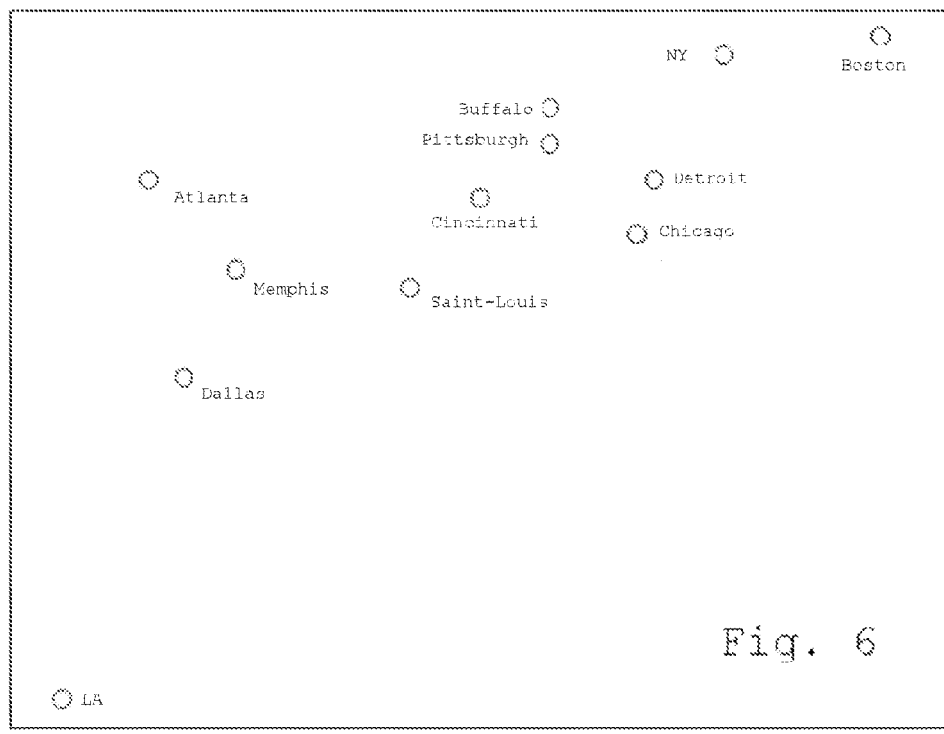

Fig. 6

Example 3

European Countries Food Consumption in 1994:

9 variables 16 observations

| | Cereals | Rice | Potatoes | Sugar | Vegetables | Meat | Milk | Butter | Eggs |
|---|---|---|---|---|---|---|---|---|---|
| Belgium | 72,2 | 4,2 | 98,8 | 40,4 | 103,2 | 102 | 80 | 7,7 | 14,2 |
| Denmark | 70,5 | 2,2 | 57 | 39,5 | 50 | 105,8 | 145,2 | 4,1 | 14,3 |
| Germany | 71,3 | 2,3 | 74,1 | 37,1 | 83,1 | 97,2 | 90,7 | 6,9 | 14,8 |
| Greece | 109,8 | 5,4 | 90 | 30 | 229,5 | 77,1 | 63,1 | 0,9 | 11,3 |
| Spain | 71,4 | 5,8 | 107,8 | 26,8 | 191,7 | 102,1 | 98,4 | 0,6 | 15,3 |
| France | 73 | 4,3 | 78,2 | 34,1 | 95 | 110,5 | 98,9 | 8,9 | 15 |
| Ireland | 93,4 | 3,2 | 151,5 | 34,8 | 55 | 105 | 185,9 | 3,4 | 11,4 |
| Italy | 110,2 | 4,8 | 38,6 | 27,9 | 181,9 | 88 | 65 | 2,4 | 11,1 |
| Netherland | 54,6 | 5 | 86,7 | 39,7 | 99 | 89,4 | 136,2 | 5,4 | 10,7 |
| Portugal | 86 | 5,7 | 106,6 | 29,4 | 100 | 75,5 | 96 | 1,5 | 7,7 |
| Gr.Britain | 74,3 | 4,5 | 94,1 | 39,8 | 60 | 74,4 | 129,3 | 3,2 | 10,8 |
| Austria | 68,7 | 4,2 | 62,6 | 37,1 | 81,9 | 93,4 | 121,3 | 4,3 | 13,4 |
| Finland | 70,1 | 5,4 | 61,6 | 35,7 | 52,6 | 65 | 208,4 | 5,8 | 10,9 |
| Island | 79,7 | 1,9 | 50,2 | 54,9 | 50 | 71,7 | 205,6 | 4,6 | 11,3 |
| Norway | 76,9 | 3,5 | 73,2 | 37,3 | 48,3 | 54,9 | 176,5 | 2,1 | 11,3 |
| Sweden | 69,3 | 4,3 | 70 | 37,5 | 48,5 | 60,5 | 154,1 | 5,7 | 12,9 |

Fig. 7

| Variables | Complement |
|---|---|
| 1 AgeExam | 1-AgeExam |
| 2 AgeDeath | 1-AgeDeath |
| 3 EdYears | 1-EdYears |
| 4 ADL | 1-ADL |
| 5 WRCL | 1-WRCL |
| 6 CNPR | 1-CNPR |
| 7 BOST | 1-BOST |
| 8 VRBF | 1-VRBF |
| 9 MMSE | 1-MMSE |
| 10 TangleNeocortex | 1-TangleNeocortex |
| 11 TangleHippo | 1-TangleHippo |
| 12 PlaqueNeocortex | 1-PlaqueNeocortex |
| 13 PlaqueHippo | 1-PlaqueHippo |

Fig. 10

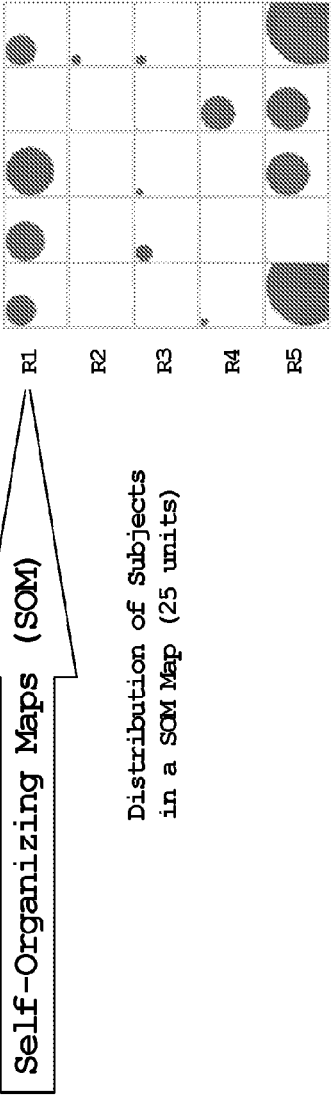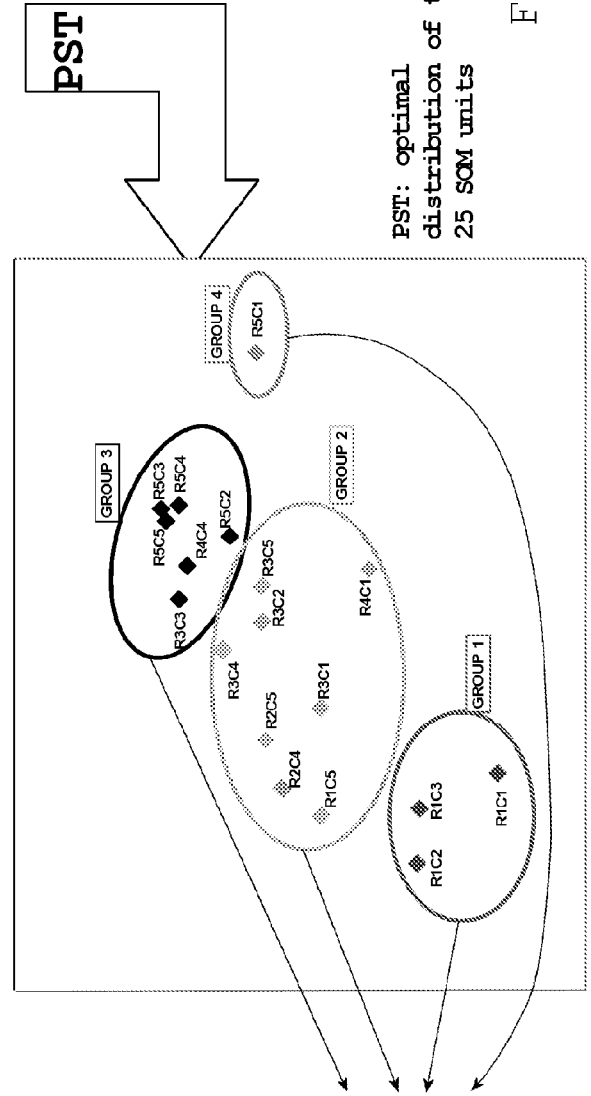
Fig. 13

Explorative hypothesis of Natural Clustering

| Variables | |
|---|---|
| Age_last_exam | |
| Age_death | |
| Education_Years | |
| Walk | |
| Dress | |
| Stand | |
| Toilet | |
| Eat_Drink | |
| WRCL | |
| CNPR | |
| BOSTON | |
| VRBF | |
| MMSE | |
| Apolipoprotein_E4 | |
| Score_Athero | |
| TC-NeoCortex | |
| TC-Hippocampus | |
| PC-NeoCortex | |
| PC-Hippocampus | |

→ Unsupervised Organisms →

Codebooks Prototype of each Group

| Variables | Group-1 | Group-2 | Group-3 | Group-4 |
|---|---|---|---|---|
| Age_last_exam | 90,7579 | 89,3621 | 84,9923 | 88,1756 |
| Age_death | 91,4622 | 90,1110 | 86,0971 | 89,1812 |
| Education_Years | 14,5917 | 14,2293 | 15,2572 | 16,0271 |
| Walk | 0,0605 | 0,5899 | 0,9713 | 0,9768 |
| Dress | 0,0453 | 0,4409 | 0,9791 | 0,9466 |
| Stand | 0,0652 | 0,5912 | 0,9913 | 1,0000 |
| Toilet | 0,0041 | 0,1725 | 0,9560 | 0,9780 |
| Eat_Drink | 0,0280 | 0,6173 | 0,8813 | 0,9347 |
| WRCL | 0,2860 | 2,2480 | 5,3737 | 3,4404 |
| CNPR | 2,5170 | 8,0884 | 9,5579 | 9,6409 |
| BOSTON | 3,1969 | 9,4987 | 11,8490 | 10,6115 |
| VRBF | 1,9532 | 7,3083 | 12,2307 | 12,5998 |
| MMSE | 4,7406 | 17,5601 | 25,7396 | 23,2561 |
| Apolipoprotein_E4 | 0,3323 | 0,1622 | 0,0076 | 0,8658 |
| Score_Athero | 0,4845 | 0,4546 | 0,3899 | 0,5456 |
| TC-NeoCortex | 15,5941 | 7,7160 | 0,9555 | 7,2049 |
| TC-Hippocampus | 39,0581 | 33,3978 | 11,9865 | 31,9796 |
| PC-NeoCortex | 8,2940 | 5,7019 | 3,6005 | 6,3076 |
| PC-Hippocampus | 4,0608 | 3,0796 | 0,9535 | 5,1484 |
| Number of subjects | 27 | 22 | 50 | 18 |
| Number of Demented | 25 | 14 | 6 | 1 |
| Demented in % | 92,59% | 63,64% | 12,00% | 5,56% |
| Number of MCI | 1 | 6 | 15 | 7 |
| MCI in % | 3,70% | 27,27% | 30,00% | 38,89% |

Fig. 14

Distances between atoms ((-1) indicates lacking information about distances)

METHOD, COMPUTER PROGRAM AND COMPUTER READABLE MEANS FOR PROJECTING DATA FROM A MULTIDIMENSIONAL SPACE INTO A SPACE HAVING FEWER DIMENSIONS AND TO CARRY OUT A COGNITIVE ANALYSIS ON SAID DATA

CROSS REFERENCE TO RELATED APPLICATIONS

This application is the United States national stage filing of corresponding international application number PCT/EP2004/051190, filed on Jun. 22, 2004, which claims priority to and benefit of European Application No. 03425436.7, filed on Jul. 1, 2003, each of which is hereby incorporated herein by reference.

FIELD

An algorithm for projecting information data belonging to a multidimensional space into a space having fewer dimensions, a method for the cognitive analysis of multidimensional information data based on said algorithm, a program comprising said algorithm stored on a recordable support, and an apparatus having artificial intelligence.

The invention relates to an algorithm for projecting information data belonging to a multidimensional space into a space having fewer dimensions.

The invention relates particularly to the field of artificial intelligence and the aim is to allow a machine able to carry out computational tasks to analyze complex n-dimensional data in order to represent these data in a two or three dimensional space and so to evaluate these data for cognitive tasks, for example to create a simplified and representable image of the data or to evaluate the existence of relationships between a group of data records, which relationships cannot be represented by exact computable or mathematical functions or for computational tasks, in order to solve a problem, which is not based on exact mathematical functions.

BACKGROUND

As it is known, nature cannot be always represented by functions having an exact solution or by a system of equations having a mathematical solution. In the exact sciences a model may be constructed for simplifying the relationships and helping the mathematical inspection to be carried out in order to achieve a mathematical representation of the relationships between data or a correlation among data appearing as not correlated, and a mathematical tool for evaluating the degree or level of the correlation of the data. Furthermore the models may consist in recognizing and constructing images or structures and provide for a graphic representation.

Further to the problem of having tools for apparati having artificial intelligence, in order to better understand, classify and evaluate the physical or chemical world and nature, it has to be noted that artificial intelligence is not limited to the analysis and inspection of nature only relatively to exact scientific or technical problems or structures but must be also confronted with social problems which are far most difficult to be represented by the mathematical tools or by exact computable functions. In this case, the apparatus is confronted with individuals having a specific behavior and acting on their own mind or by means of reactions to instincts, which actions cannot be described by mathematical models because there is no mathematical model and also because there is no clear and univocal rule defining the relations between events whichever kind they are and the behavior.

Human beings have the capacity of analyzing environmental stimuli and deciding to carry out an action as a response to said stimuli also when apparently the stimuli have no relationship among them or are not correlated. This process is carried out sometimes in a non-conscious way giving rise to logically non-predictable actions if considering the known relationship of the stimuli if one ever exists. Nevertheless the action is often correct or approximately correct or leads to a certain successful effect. Such kind of behavior which we can define as intuition or the like seems not to have any logical basis or seems not to be caused by a logical thought.

Since artificial intelligence is based on computational machines there is the need of instruments which may help these machines to analyze or transform information data in such a way as to be simply handled and used by the machine and in such a way as to allow the machine to recognize and/or generate relationship functions which are easier to handle from the mathematical or computational point of view without distorting or leaving information and giving thus the opportunity to simulate at least at a certain degree the "intuitive" behavior of the human intelligence.

Records of a database may be represented as points in a space, the position of the points being determined by variables values which describes the records of the database. In principle the representation may also be reversed in the sense that the variables are represented as points in a space, while the position of each variable is defined by the records. This projection brings certain advantages. As a first technical advantage, certain relationship may be discovered which were hidden in the n-dimensional space of the information data being not intelligible either by human beings nor by machines, since the relative position of the records and/or of the variables in the space where the records or the variables are represented by points is a measure of their similarity or difference. A second technical advantage is that the simplifying of the information data helps in transforming the data in data which may subjected to a computational evaluation and thus to help the machine to analyze the data to determine an appropriate response to the data and to carrying out its computational job in a more rapid and simple way. One might not forget that for mathematical or computational problems there might be theoretically a solution, which cannot be computed in practice.

The solution of a mapping problem allowing to reduce a three dimensional space for the data in a two dimensional space without losing or distorting the information represented by the data has also a great relevance if one considers for example a machine, which collects image data from the environment and which has to generate an image recognizing the objects or at least discriminating certain objects between objects constituting obstacles and objects which do not constitute obstacles and also between objects that might constitute obstacles at a later time. In this case a machine which has the possibility of reducing information about physical objects placed in a three dimensional space and which have a three dimensional extension in a two dimensional map would allow to dramatically simplify the machine construction and to dramatically reduce the computational burden.

The above described technical advantages are present already if one considers non humanoid machines having artificial intelligence. Considering for example humanoid machines such like humanoid robots, the advantages become more important since such a machine has a large number of sensors and a very high computing and evaluation burden is sent to the processing units.

The algorithm to which the present invention relates has not only relevance for artificial intelligence, but can also help human intelligence in inspecting and analyzing the relationships between information data belonging to a n-dimensional space, where n is bigger then 3 by projecting the data onto a two or three dimensional space. This is a representation which can be understood by human intelligence having its senses constructed to sense a three dimensional or two dimensional space. Thus a representation of data in this space can help human intelligence to understand and find out relationships which could be not be recognized in a four or more dimensional space.

A known algorithm for projecting data from a n-dimensional space into a less dimensional space, and particularly onto a three or two dimensional space, uses a predetermined characteristic projection function for computing the position of each point in the projection space. An example for such kind of projection algorithm is the so called Principal Component Analysis, briefly PCA which is described in H. Hotelling "Analysis of a Complex of Statistical Variables into Principal Components" J. Educ. Psychol., 24:498-520, 1933. This algorithm provides the steps of defining N factors and N new variables which are orthogonal. Using this base of new variables a reorganisation of the data is carried out by attempting to put as much information as possible in the first factors under the constraint of linearity. The mapping consist in rewriting the observations/variables using the computed factors and in plotting each one on a two dimensional map using as coordinates the computed factors F1/F2, F3/F4 and so on.

This kind of projection algorithm working only on the base of linear projections determines that some information will be lost during the projection. In order to understand this situation consider a normal projection from a three dimensional space onto a two dimensional space. In a linear projections two points having a certain distance along one of the three dimensions might appear very near if the two dimensional projection space is perpendicular to the third dimension along which the two points are spaced apart. In a very simplified manner this situation takes place using a PCA algorithm. The result of the known technique is that, in the less dimensional space where the information data has been projected, the data relationships is distorted in a dramatic way and the distortion can go so far as to cancel or abnormally enhance relationships between data.

SUMMARY

The algorithm according to the present invention has the aim of projecting N-dimensional information data onto a less dimensional, particularly onto a two or three dimensional space without distorting in an excessive manner the relationships between the data.

The algorithm according to the present invention has the following steps:

Providing a database of N-dimensional data in the form of records having a certain number of variables;

Defining a metric function for calculating a distance between each record of the database;

Calculating a matrix of distances between each record of the database by means of the metric function defined at the previous step;

Defining a n−1 dimensional space in which each record is defined by n−1 coordinates;

Calculating the n−1 coordinates of each record in the n−1 dimensional space by means of an evolutionary algorithm;

Defining as the best projection of the records onto the n−1 dimensional space the projection, in which the distance matrix of the records in the n−1 dimensional space best fits or has minimum differences with the distance matrix of the records calculated in the n-dimensional space.

As evolutionary algorithms so called genetic algorithms may be used.

Such kind of algorithm provides new solutions based on a starting parent population of solutions, which may be computed according to various ways such as for example casual attempts. The solutions of the parent populations are combined in a way that follows the basic combination of genes in genetics, thus giving new and different solutions, in which a fitness score, for example in this case the error or difference from the distance matrices of the n- and the n−1-dimensional spaces, is evaluated for giving a certain relevance to the solution, which will influence the possibility of combination with other solutions of the new generation for generating a further generation.

This kind of computation makes use of an evolutionary algorithm in order to compute the position of the points in the projection space in such a way to minimize the error with respect to the distances of the points in the original space and is always independent on the specific structure of the information data. Thus, contrary to the PCA algorithm of the state of the art the algorithm according to the present invention does not use a predetermined characteristic projection function which computes the position of the points in the projection space.

The algorithm according to the present invention combines the projection of the information data with a particular evolutionary algorithm, which will be described with greater detail in the following description of the examples.

More in detail and referred for simplicity to a projection into a two dimensional space, the mathematical problem which the present algorithm solves is the following:

Given N points and their distances in a L dimensional space, find into a 2 dimensional space the optimal distribution of these points according to the matrix of their constrained distances.

In strict mathematical language the above mentioned problem may be expressed as follows:

Defining a Map Distance in the two dimensional space such as for example:

$$Md_j = \sqrt[3]{(Px_i - Px_j)^2 + (Py_i - Py_j)^2}$$

Where Md is the map distance and i and j are the number of the points and where Px and Py are the coordinates of the point in the two dimensional space.

Defining also a Vector Distance such as $$Vd_{i,j} = \sum_{k=1}^{L} |Pv_{ik} - Pv_{jk}|$$

Where Vd is the vector distance i and j are the indices of the different points and $v_k$ are the vector components. Thus the mathematical problem is to carry out the following optimization:

$$\min E; E = \frac{1}{C} \cdot \sum_{i=1}^{N-1} \sum_{j=i+1}^{N} |Md_{ij} - Vd_{ij}|; C = \frac{N \cdot (N-1)}{2}$$

Due to the reduction of the number of dimensions in the projection, there might be a situation in which two points might not be separated one from the other if the projection is carried out in a classical way. Thus no exact projection can be carried out from the mathematical point of view if information has to be not distorted or maintained at least partially in the less dimensional space.

The present algorithm solves the above problem by encoding each individual record represented by a point having coordinate X and Y. A set of different X and Y coordinates for each point is defined forming a first population of projections onto the less dimensional space, usually a two or three dimensional space.

For each of the projections of this first population, the fitness score is calculated by using as the fitness function the matrix of distances of the single points in the originally N dimensional space. The population of projections is then subjected to combination according to the combination rules of the genetic algorithm thus producing a first generation population of projections which comprises X and Y coordinates for the points which are a combination of the coordinates provided in two projections of the parent generation.

The fitness score of the projections of the first generation is evaluated and again a new generation is formed based on the first generation.

Using certain combinatory criteria of the projections of the parent generation based on the fitness score of this parent generation, the genetic algorithm at each generation, calculates the solution having a better fitness scores thus converging against the best solution.

Several genetic or evolutionary algorithm are known, which differ one from the other mostly in the combinatory criteria of the parents in order to generate the next generation of solutions. This criteria relates to the admitted or forbidden "marriages" of two individuals of the parent population and in the mechanism with which the two parents individuals combine their set of data, in this case the different coordinates of the points in the less dimensional map.

As an example a particular genetic algorithm used according to the invention is the so called Genetic Doping Algorithm disclosed in detail in BUSCEMA, 2000: M. Buscema, Genetic Doping Algorithm GenD), Edizioni Semeion, Technical Paper 22e, Rome 2000 and Massimo Buscema & Semeion Group "Reti neurali artificiali e sistemi sociali complessi", Year 1999, Edizioni Franco Angeli s.r.l. Milano, Italy, chapter 21, which disclosures are considered to be part of the present specification.

Briefly summarized, the GenD algorithm provides for special modified rules for generating the new individuals of a following generation from the parents population.

As usual in the genetic algorithm, as a first step, GenD calculates the fitness score of each individual, depending on the function that requires optimisation, in this case the distribution function of the data records in the general data set onto the training set and the testing set. The average health score of the entire population is then computed. Average health constitutes the criterion firstly of vulnerability, and secondly of recombination, of all the individuals of the population, for each generation.

All individuals whose health is lower than or equal to the average health of the population are entered in a vulnerability list. This individuals are not eliminated, but continue to take part in the process being only marked out. The number of vulnerable individuals automatically establishes the maximum number of marriages permitted for that generation. The number of possible marriages for each generation thus varies according to the average health of the population. At the third step GenD algorithm couples the individuals. The entire population participate to this possibility. The maximum number of random coupling calls corresponds to half the number of individuals marked out as vulnerable.

For coupling purposes and the generation of children both the candidate individuals must have a fitness value close to the average fitness value of the entire population. Furthermore each couple of individuals may generate off-springs since it is sufficient for marriage that at least one of the two individuals of the couple enjoy health values close to the health average of the entire population or even higher. According to another recombination rule GenD algorithm does not consider possible marriages between two individuals of which one has a very low health value and the other a very high health value in comparison to the average health value of the population. This means that too weak individuals and too healthy individuals tend not to marry themselves.

Recombination by coupling does not mean classic cross-over of the genes of the parents individuals. GenD algorithm effects selective combination of the parents genes by means of two types of recombination; a logic crossover; when repetitions are allowed and an opportunistic crossover; when repetitions are not allowed.

The logic crossover considers four cases:
1. Health of the father and mother are greater than average health of the entire population;
2. Health of both parents is lower than the average health of the entire population;
b 3. and 4. The Health of one of the parents is less than the average health, while the health of the other of the parents is greater than the average health of the entire population.

If the case 1 does occur than recombination will be effected with a traditional crossover.

If the second case occurs, than the generation of the two children occurs through the rejection of parent's genes.

If case 3 or 4 occur, than the genes of the more healthy parent are transmitted to the children, while the genes of the less healthy parent are rejected.

In the above the definition of rejection does not mean that the rejected genes are cancelled but only that these genes are substituted. Genes substitution is not random but is carried out by means of a sliding window criterion. Each gene may have different genetic options or states. In this case substitution by a sliding window means that the actual rejected gene will be substituted by the same gene but having another state as the original one. So during substitution the criterion used by the GenD algorithm provide only the substitution of the state of that gene which assumes a different state as the gene had in the parent individual.

Relating to the opportunistic crossover, this crossover works when repetition are not allowed. In this case the parents have overlapping genes with respect to a random crossover point. In this case an offspring is generated selecting the more effective gene of the parents. The mechanism is repeated until all the off-springs are completed.

A further criterion of the GenD algorithm rely upon a final opportunity criterion which is a mechanism that enables weak individuals being marked out and having never had the opportunity to be part of a marriage to re-enter the coupling mechanism thanks to a mutation. The number of possible mutations is calculated as the difference of the number of potential marriages and the number of marriages carried out. Mutations occur to those individuals which are present and marked out in the vulnerability list. In this way individuals that had never the opportunity to be part of a generation process are given a final opportunity to enter the evolutionary process.

From the above short explanation of the principal features of this special genetic algorithm, it appears clearly that in the GenD algorithm the number of marriages and of mutations are not external parameters, but adaptive self-definable internal variables, taking into account the global tendencies of the population system.

Furthermore, it appears also clearly that the basic unit of the GenD algorithm is not the individual, unlike the classic Genetic Algorithm, but the species, which acts on the evolution of individuals in the form of the average health of the entire population of each generation. The feedback loop between individuals and the average health of the population enables the present algorithm to transform in evolution terms the population as a whole from a list of individuals into a dynamic system of individuals.

As a further improvement step of the algorithm according to the present invention, a so called hidden point may be defined. This hidden point whose existence is only guessed is added in the parent population by giving to it position coordinates $X_{hi}$ and $Y_{hi}$ in the projection.

The calculation of the evolutionary algorithm may be carried out in parallel with the hidden point and without the hidden point and the best fit projections obtained by the two parallel calculations may be compared. Hidden points might help in better appreciating the peculiarities of the real positions of the points in the N-dimensional space and so better approximate these positions in the less dimensional projection.

FIG. 1 summarizes briefly the mechanism of the present algorithm relatively to the evaluation with and without the hidden unit.

Although the example has been described in relation to a projection from a L dimensional space into a two dimensional space, it is clear that the algorithm works similarly also from projections in a three dimensional space or in a L−1 dimensional space. Usually the projections in a two or three dimensional space are the preferred ones since the data representation can be better understood by human beings. When using the present invention for giving more cognitive capacity to apparati provided with artificial intelligence, also four or more dimensional spaces can be used if it is needed for carrying out the tasks for which the apparatus has been designed.

The projection carried out with the present algorithm may be on a Euclidean two or three dimensional space. Alternatively the way the algorithm calculates the projection might be understood as projecting the points for example not in a two dimensional plane but on a two dimensional surface, which is somehow curved and nevertheless represented graphically on a plane.

Given a certain database comprising a certain number of records each one characterized by a certain number of variables, the present algorithm might be applied for projecting the database in two different ways.

A first way is to consider the records as being points and the variables as being the coordinates of the points.

The second way is symmetrically reverse this situation by considering the records as variables.

The two spaces are defined as observation and variable spaces and the projections can bring to discovering relations between records and/or between variables.

In the following description of different examples it will be possible to appreciate the effectiveness of the present algorithm and the information which might be recovered by means of the hidden point and also by means of the two projections. From the specific examples the technical meaning of the present algorithm will also appear clearly, which goes beyond the fact of allowing to calculate in a very rapid way the less dimensional map of the points in a fully independent way from the structure and meaning of the information data represented by each point or record. In the field of artificial intelligence and thus, for example, robotics, this technical meaning resides in the fact that a computational machine may be able to analyze information data and to recognize or define relationships despite their complexity. The recognitions of relationships of information data in complex problems are important for giving the machine not only computational power but also allowing the machine to take decisions relating the particular tasks the machine is destined to carry out.

The algorithm according to the present invention can be used for providing a method for the cognitive analysis of multidimensional information data.

After providing a database comprising a certain number of records each one representing the relationship between one feature and a certain number of variables, a distance matrix of the records in the N-dimensional space defined by the number of variables characterizing each record is calculated according to a certain metric function.

This matrix is taken as the fitness matrix for the projection of the records or the variables into a less dimensional space, particularly a two or three dimensional space using the algorithm described above.

The representation of the records or of the variables in a two or three dimensional space may be used for recognizing certain relationships among the records or among the variables.

An example of a particular problem to which the present method can be applied relates to the fact of determining the structure of a certain molecule when distances between at least some atoms forming the molecules are known. This problem is of the kind so called not bound optimization problem.

The method can calculate a three or two dimensional projection of the structure of the molecule which may be graphically represented in an intelligible way for human beings. Furthermore relating to this problem when analyzing complex molecules, the projection can be carried out by adding the hidden individual, which in this case could be a hidden atom and thus offering a tool for inspecting molecular composition and structures of highly complex molecules.

The method according to the present invention being independent on the structure of the information data can handle also non-mathematical problems such as for example sociological problems. A first step of giving a numeric scale of evaluation of the different social variables considered might be provided in this case. Normally this is not a critical problem since such kind of variables often are characterized by different states, which can be defined by the value true, not true and not present so that the scale in this case could be defined as 1, (−1), and 0.

According to a further feature of the method, the algorithm according to the present invention, used for projecting the information data from the N-dimensional space onto a less dimensional space, particularly a two or three dimensional space, may be applied in combination with other kind of projection algorithms, which are somehow more sensitive to the information data structure.

A particular algorithm which can be used in combination with the present projection algorithm is the so called "SOM" Self Organizing Map) algorithm which is a clustering algorithm. The SOM is a known algorithm which is described in more details in KOHONEN, 1995: T. Kohonen, Self Organising Maps, Springer Verlag, Berlin, Heidelberg 1995 or Massimo Buscema & Semeion Group "Reti neurali artificiali e sistemi sociali complessi", Year 1999, Edizioni Franco Angeli s.r.l. Milano, Italy, chapter 12.

SOM assumes a prior definition of the projection grid and projects codebooks of records in this grid via a competitive algorithm where dominant variables prevail over others.

The SOM projections gives rise to data clusters, so called Kohonen units. The SOM algorithm is thus used to perform a first elaboration of the information data, while the algorithm according to the present invention is then used to reproject the Kohonen units emerging from the first elaboration in a coordinated and more detailed manner on its own map.

This procedure allows to take advantage of the peculiarity of the SOM algorithm to consider the significance of the variables and to take also advantage of the features of the present projection algorithm, which can evaluate the fitness score of the projection performed by referring to the fitness function which is the distance matrix of the points representing the information data in the N-dimensional space and which can also consider hidden units. Thus the reproduction accuracy in the less dimensional space is ensured and a more complex projection, which can provide for greater information, is performed. FIG. 2 schematically illustrates the combination of SOM algorithm with the present algorithm. Thanks to the present algorithm the advantages of the SOM algorithm are combined with the fact that the present algorithm can dynamically deform the original projections space by hidden units increasing the reconstruction accuracy of the projection.

The invention relates also to a method for constructing two or three dimensional structural images of molecules starting from complete or incomplete data about the distances of the atoms of the molecule.

The invention relates also to a machine having artificial intelligence which is able to carry out actions based on processes simulating the "intuitive" reasoning of human intelligence when subjected to apparently not correlated data of non chemical or physical nature and/or collected physical or chemical data from the environment.

BRIEF DESCRIPTION OF THE DRAWINGS

FIG. 3 is a database of highway distances between Italian cities according to example I.

FIG. 4 is the two dimensional projection map of the cities of the database according to the database of FIG. 3.

FIG. 5 is a database of flight distances between US cities according to example II.

FIG. 6 is the two dimensional projection map of the cities of the database according to the database of FIG. 5.

FIG. 7 is a database of the European Countries Food Consumption in 1994 according to example III

FIG. 10 is a table of 13 variables and their complement of a fourth example.

FIG. 13 illustrates a fifth method according to the present invention in which the projection algorithm is used in combination with a so called Self Organizing Map.

FIG. 14 is a further diagram illustrating the method according to FIG. 14 and the table of codebooks prototypes of the groups of variables defined by the projection of the database on the two dimensional map.

FIGS. 17 to 19 illustrate an example of the method according to the present invention for generating two or three dimensional images of the structure of a molecule form incomplete data of the distance of the atoms forming said molecule.

DETAILED DESCRIPTION

Example I

Figure 1:
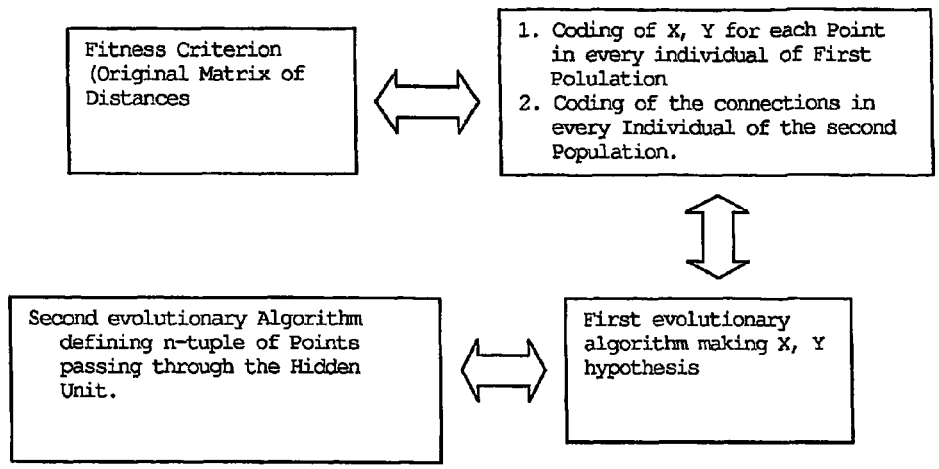
FIG. 1 illustrates a diagram of the architecture of the projection algorithm according to the present invention.
Figure 2:
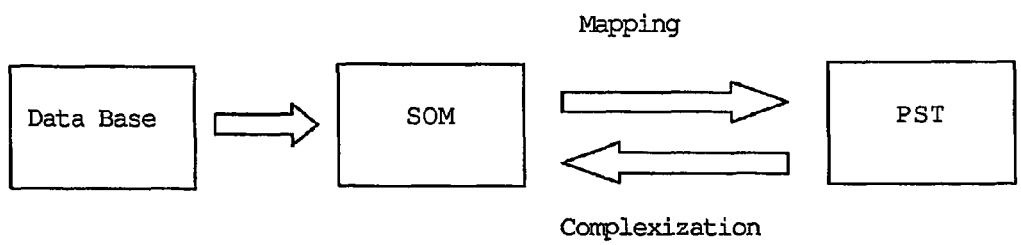
FIG. 2 illustrates a diagram of the combination of the algorithm according to the present invention with a SOM algorithm.

Example I clarifies the way the algorithm operates in order to generate a map from data relating to distances between objects.

In FIGS. 3 and 4 there is described a first example of dataset and two dimensional mapping using the algorithm according to the present invention.

A dataset comprising ten Italian cities and their highway distances is provided. The highway distances are not true two dimensional distances in an Euclidean Space, since every highway distance has three kind of alteration namely: a longitudinal alteration, an altitude alteration and a structural alteration. Thus creating a two dimensional map of the cities where the cities are placed considering only the highway distances using a linear algorithm would determine a distortion of the position of the cities with respect to their real relative position.

The city of Arezzo is not given to the algorithm with its distances from the other cities, but free determinable distances values are given to the algorithm so that the algorithm is called to look for a hidden city of which the existence is assumed and of witch the position is not known.

A first randomized distance value of the hidden city can be given in the distance matrix for the hidden city so that the algorithm can be initialised and can start to correct the randomized initial position of the hidden city. As it appears clearly from FIG. 4 a comparison of the map drawn by the algorithm according to the invention with a geographical map allows to identify the hidden city as the city of Arezzo.

Using the algorithm according to the present invention which carries out a non linear projection also the other cities being defined by their distances in the database are placed onto the two dimensional map by optimising their relative position with respect to the matrices of their relative distances. The distortion relative to the real position is very low and the solution is illustrated in FIG. 4.

Example II

Example II is a similar mapping problem as example I. In this case the database comprises twelve US cities and their relative flight distances. No hidden unit has been provided.

Also in this case the flight distances are affected by alterations similar to example I.

Also in this case a linear projection of the cities onto a two dimensional map would not take correctly care of the above mentioned alterations and the position of the cities on the map would be distorted relatively to reality.

The result obtained by the present algorithm is a map which is illustrated in FIG. 6 and where the positioning of the cities has an error of only 3.07% with respect to the matrix of distances while the positions of the cities is very close to the real geographical position.

Example III

Example III is a more complex one. This example clarifies how the algorithm works in order to generate relations or correlations among data which apparently have no logical relationship.

The database relates to the European Countries Food Consumption in nineteen ninety four. It comprises nine variables relating to the food kind, namely: cereals, rice, potatoes, sugar, vegetables, meat, milk, butter, eggs.

Sixteen observations where made relating to sixteen countries, namely: Belgium, Denmark, Germany, Greece, Spain, France, Ireland, Italy, Netherlands, Portugal, Great Britain, Austria, Finland, Island, Norway, Sweden.

Figure 8:
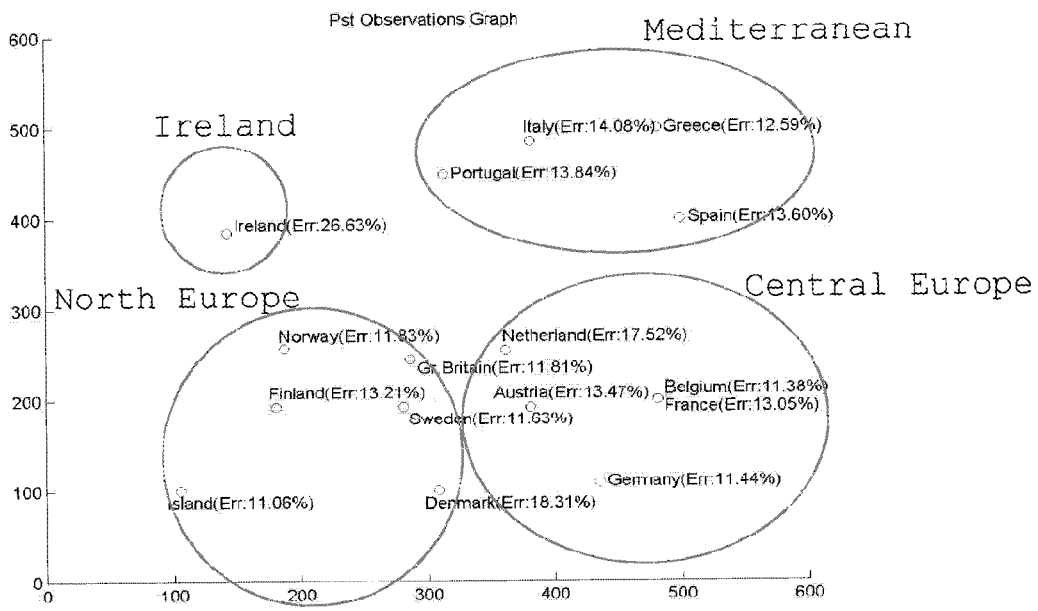
FIG. 8 is the two dimensional diagram of the projection of database of FIG. 7 in the variable space which has been elaborated by the algorithm according to the present invention.

The database was evaluated with the algorithm according to the present invention and the map according to FIG. 8 was obtained.

In the two dimensional map the circles indicates geographical areas to which the countries belong. The projection carried out by the present algorithm has shown that there are different groups of countries having similar food consumption and which countries belong to the same geographical area. Furthermore, the two dimensional projection has also highlighted that Ireland has a food consumption behaviour which is very different from that of all the other countries and particularly from the countries of the geographical area to which it belongs.

Figure 9:
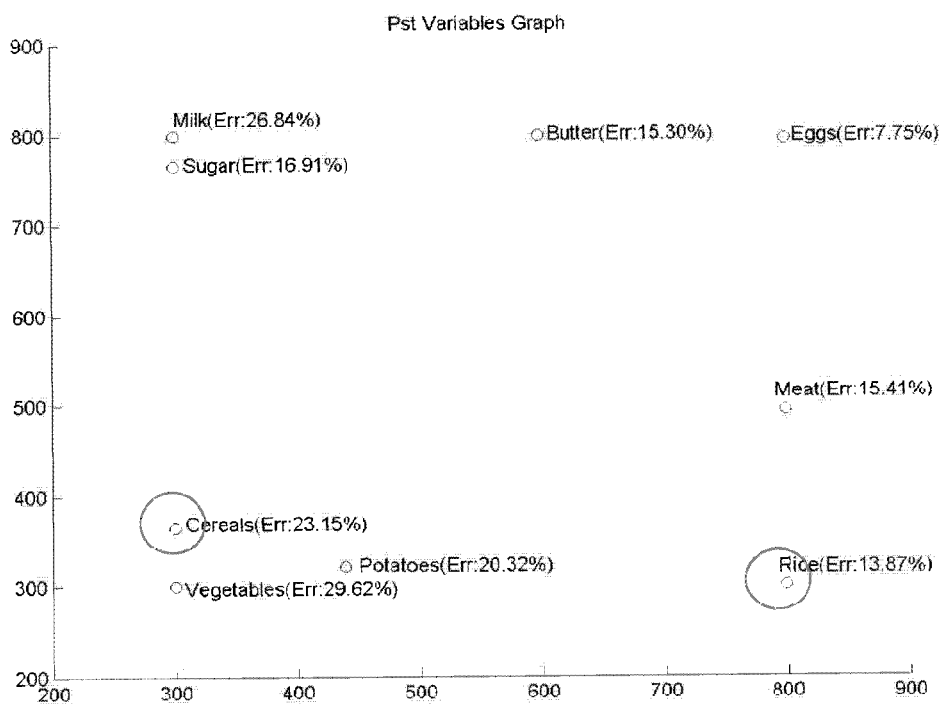
FIG. 9 is the two dimensional diagram of the projection of database of FIG. 7 in the observation space which has been elaborated by the algorithm according to the present invention.

FIG. 9 illustrates the projection of the database made by considering the records as variables, i.e. the observation countries as variables which has been defined as the observation space. The projection was also carried out by means of the algorithm according to the present invention and the map of FIG. 9 indicates also a relation which was not apparent from the database.

From the above it appears clearly that the algorithm according to the present invention carries out a projection which due to its non linearity does not lead to hidden information. The PCA algorithm needs to illustrate the information data onto two different maps for not losing information, while the projection according to the present algorithm does not hide information and relationships between the data.

Entering more in detail, the degree of correlation between data is established by the present algorithm by means of a so called "share information" equation. This equation sizes the degree of association between two points in the map. This equation expresses the "share information" between two points representing two different data records of a database in the original multidimensional space in term of probability. Thus the present method defines the degree of association between two pints in the map as a probability of association:

$$A_{ij} = \frac{\frac{\sum_{k=1}^{L}(1-Pv_{i,k})\cdot Pv_{j,k}}{L} \cdot \frac{\sum_{k=1}^{L}(1-Pv_{j,k})\cdot Pv_{i,k}}{L}}{\frac{\sum_{k=1}^{L}Pv_{j,k}\cdot Pv_{i,k}}{L} \cdot \frac{\sum_{k=1}^{L}(1-Pv_{j,k})\cdot(1-Pv_{i,k})}{L}} Pv \in [0,1] A \in [-\infty, +\infty]$$

Returning to the capability of the present mapping algorithm in finding out hidden units this capability can be used for solving further technical problems as for example for drawing two or three dimensional maps of complex molecules also in the case where the list of atoms is incomplete or where the matrix of the distances is incomplete.

It has to be noticed that as disclosed above, the database can also be incomplete, this means that despite knowing the presence of certain atoms the distances of this ones may not be known. Thanks to the ability of considering hidden units the algorithm according to the present invention can place the known atom of which the distances where not known in the distance matrix in a correct or most probable position relatively to the other atoms of the molecule.

According to another way of using the capability of considering hidden units relating to this last example, the algorithm according to the present invention is also capable of considering the presence of unknown atoms in a molecule of which the composition is not completely known and further to this the algorithm is also capable of producing an hypothesis about the most probable position of this atom relatively to the other known atoms thus helping the further study of the molecular structure.

Example IV

In FIG. 10 the table of 13 variables and their complement is illustrated. The 13 variables relates to anagraphic data and medical data of a certain number of individuals, more precisely of 117 individuals. The aim is to analyse the database in order to find out relations which are somehow connected to the Alzheimer disease or to the probability of developing the Alzheimer disease. Starting from the 13 variables the complement of this variables are defined. The complement being a complementary value of the variables.

Figure 11:
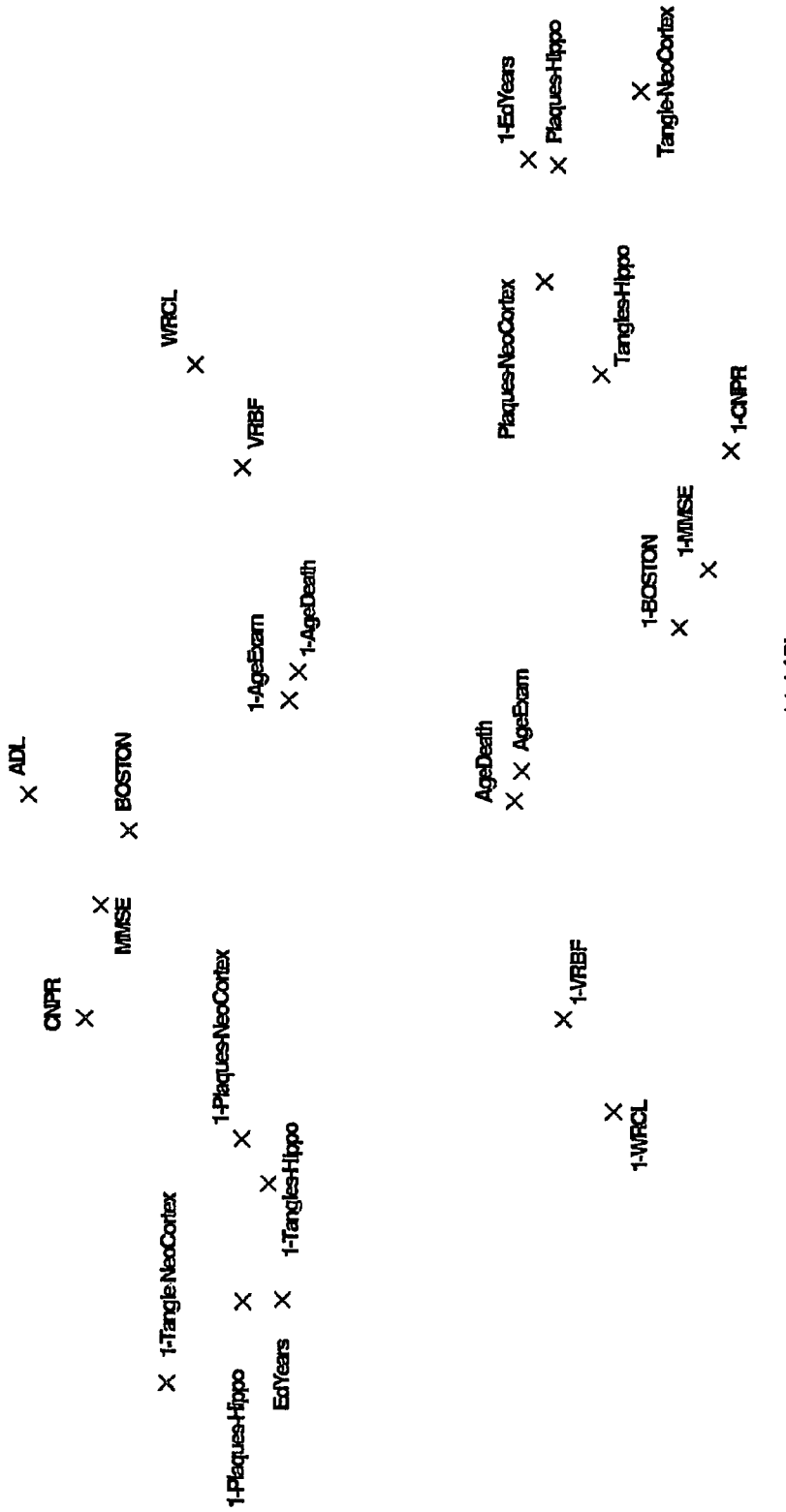
FIG. 11 is the result of the projection of the variables according to the table of FIG. 10 on a two dimensional plane with the algorithm according to the invention.

Using the aforementioned database the data has been projected onto a two dimensional plane. The result is illustrated in FIG. 11. From this map the following conclusion can be drawn: The more two variables are nearest, more their information is high and therefore the two variables are similar.

Figure 12:
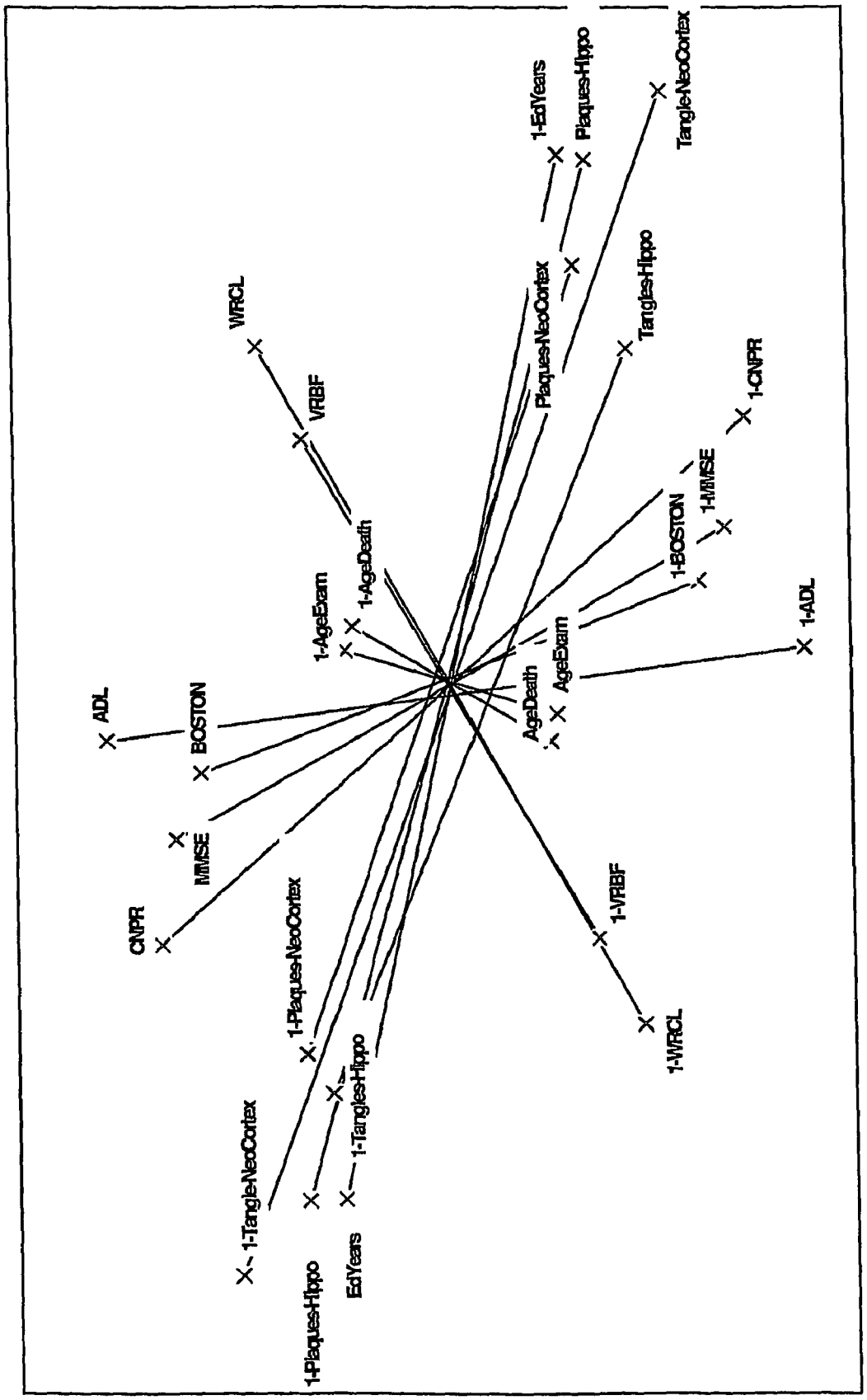
FIG. 12 illustrates the connection between the variables and the complements on the map according to FIG. 1.

In FIG. 12 the connection lines between each variable on the map and each complementary variable has been drawn in order to establish their relative distance. From the mathematical point of view it can be demonstrated that the more the connecting segment is long the more the variable is significative in the database since his standardized variance is bigger.

Example V

FIG. 13 illustrates a diagram of a combined projection algorithm comprising two different algorithm one of which is a projection algorithm according to the present invention.

A database of different variables for a certain number of individuals comprises 19 variables of medical, anagraphical and social kind. The records of the database are elaborated with an algorithm known as Self Organising Map (SOM). This algorithm clusters the records into cells or units The database is an enlarge version of the one of Example IV.

The algorithm according to the present invention is applied to the units computed by the SOM in order to distribute said units and the records clustered in it in an optimal way on a two dimensional map. Codebooks prototypes can be computed as the average of the codebooks of each unit taking part to a group.

The groups of units on the two dimensional map created by the projection algorithm are evaluated by means of their clustering on the map. It appears evident that the projection algorithm according to the invention will stress the existence of a fourth group.

FIG. 14 illustrates a diagram in which starting form the database comprising said 19 variables and subjecting the database to the SOM and afterwards to the projection algorithm four groups are generated on the projection map each group having is specific codebooks prototypes which are listed on the right table.

The variables considered are variables which can be involved in some way with the Alzheimer disease. The number of subjects considered has been of 117 patients. The different groups are characterised by different percentage of patients having developed the Alzheimer disease. The codebooks prototypes can give insight in the relevance of certain medial variables and/or certain anagraphic variables and/or certain social variables for determining the risk of developing the Alzheimer disease by an individuum.

It is interesting to notice that the age is not relevant while social variables such as intellectual level or level of schooling, physical exercise and other variables attaining to the behaviour has a high influence in differentiating the four groups and thus the risk of developing Alzheimer disease. With increasing level of schooling and/or with increasing level of physical exercise and with increasing educational and cultural level the percentage of individual having developed the disease becomes lower, despite the presence of certain pathological variables or medical variables which seems not to be relevant for differentiating the groups one from the other.

From the above mentioned projection different suggestion may be extrapolated:

Alzheimer disease at histological level starts independently from Tangles in Hippocampus or Plaques in NeoCortex, and arrives to Tangles in NeoCortex passing through Plaques in Hippocampus with different transition probabilities. This suggestion is supported by evidences coming from the projection algorithm according to the present invention and SOM Systems.

Severe Braak Stages are related to two different and unrelated pathologies (evidences supported by SOM System).

Plaques in NeoCortex and Tangles in Hippocampus distribution are connected with two different kind of subjects in SOM System MMSE, ADL, BOSTON, and CNPR are strongly connected among them, in the same way that WRCL and VRBF are connected to each other. Evidences supported by the mapping through the projection algorithm according to the present invention which puts these two groups of tests in two different areas.

Education Years are strongly connected with the Alzheimer disease pathology features (evidences supported by the algorithm according to the present invention).

The integrated use of different Unsupervised Organisms, allows the identification of four natural clusters of subjects with specific codebooks prototype.

Example VI

Example VI relates to a method for determining the conformation of a molecule of which the distance at least of certain of the atoms form at least other atoms forming the molecule are known.

In this case the method uses an algorithm according to the present invention for generating a map of the molecules which has the best fit in accordance to the known distances.

Thus a structure of the molecule can be drawn which does not lose, hide or distort information.

Figure 17:
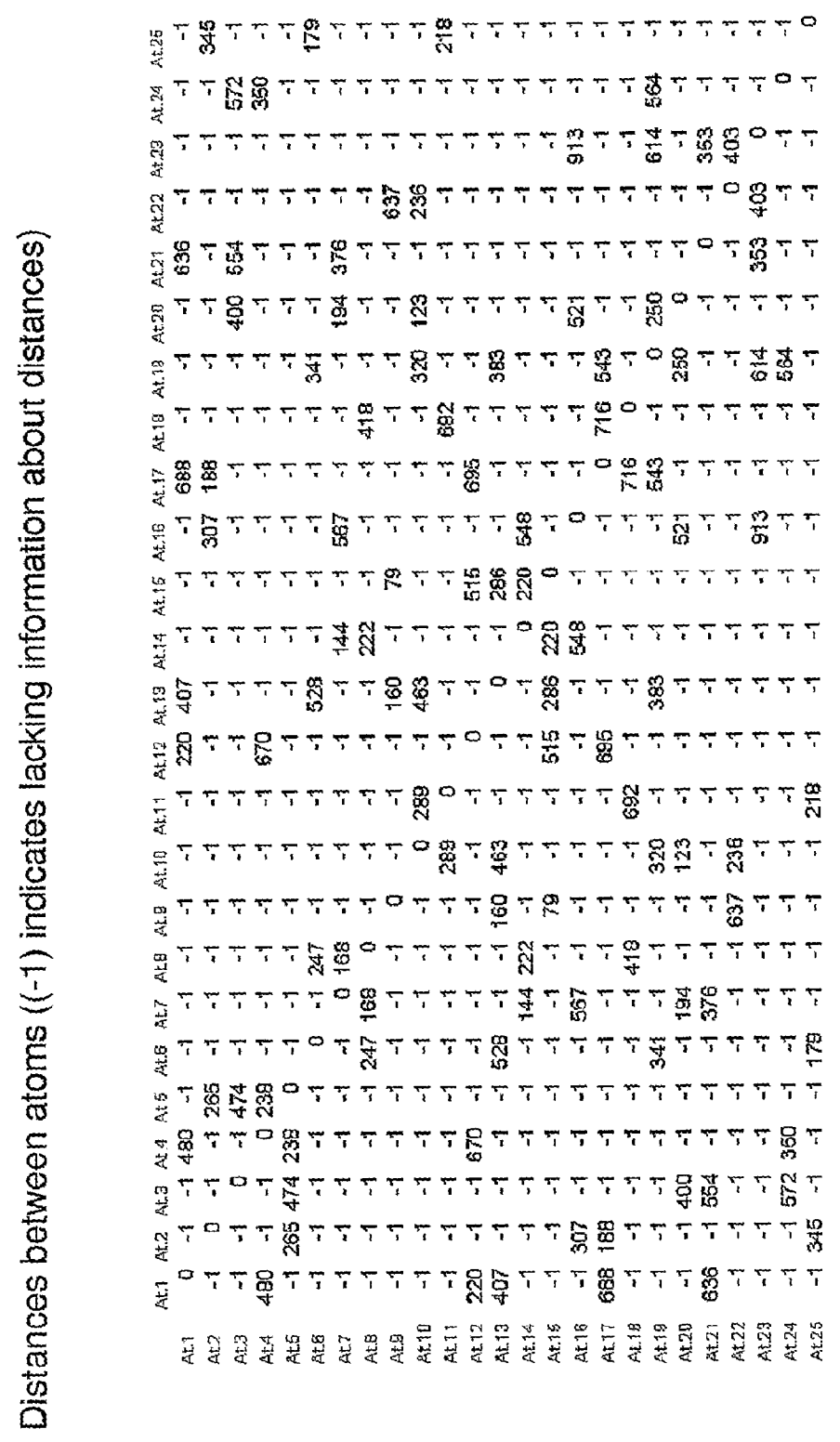

A database is formed which database comprises as variables the distances of the atoms from another atom of the molecule. The database is illustrated as a matrix in FIG. 17.

This database can be obtained by means of measurements carried out on the molecule as for example using radiographic inspection which is a common technique in Solid state physics for determining the lattice structure of crystals or other current measurement means.

Once data has been achieved from the measurements, a database is generated in the form of a matrix were each row and each column having identical row and column index identify an atom. The distances between each couple of atoms each one identified by row and column index are listed in the matrix and the result is a matrix where the diagonal elements have each one zero value and which is symmetric relatively to said diagonal. Were no data about the relative distance between two atoms is present a predefined value is given to the matrix elements. In the example the value (−1) has been chosen.

Figure 18:
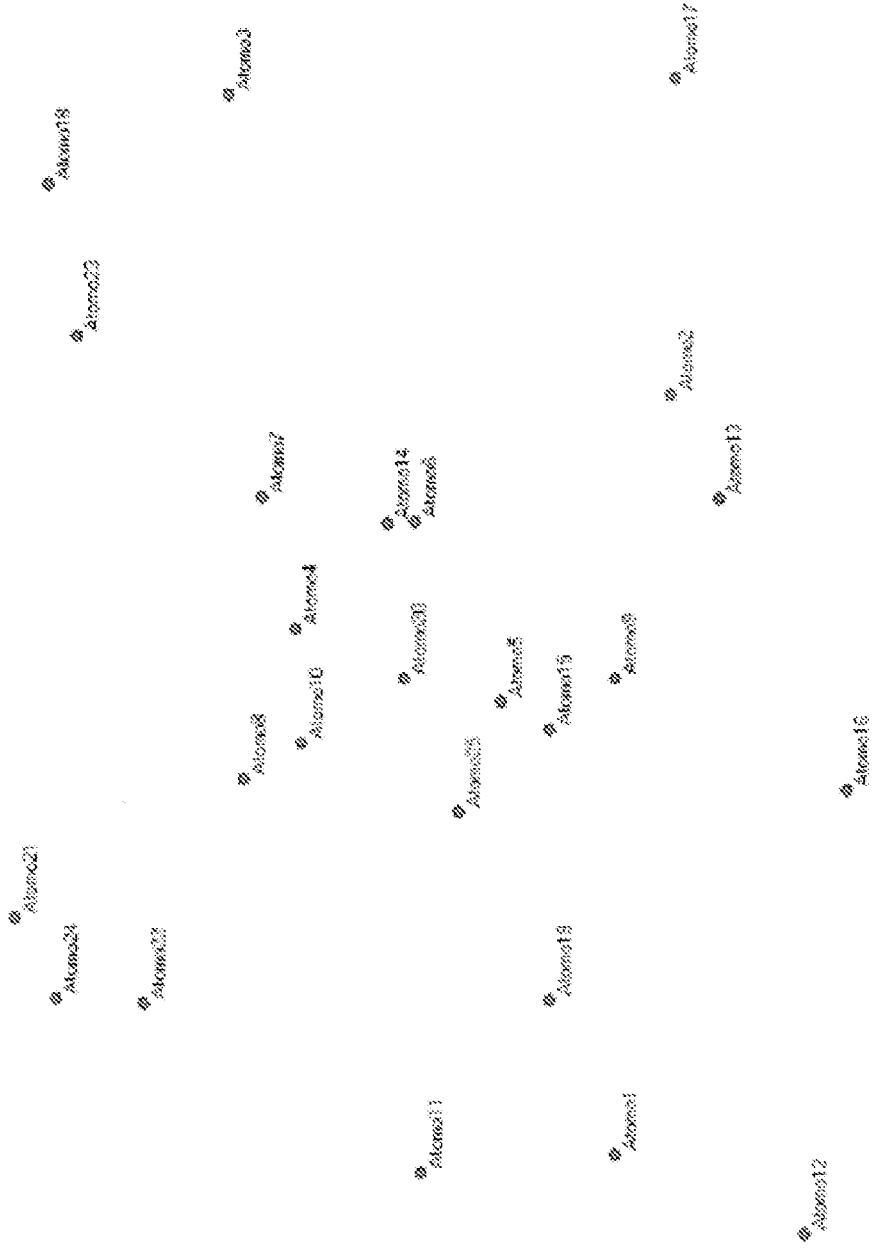
Figure 19:
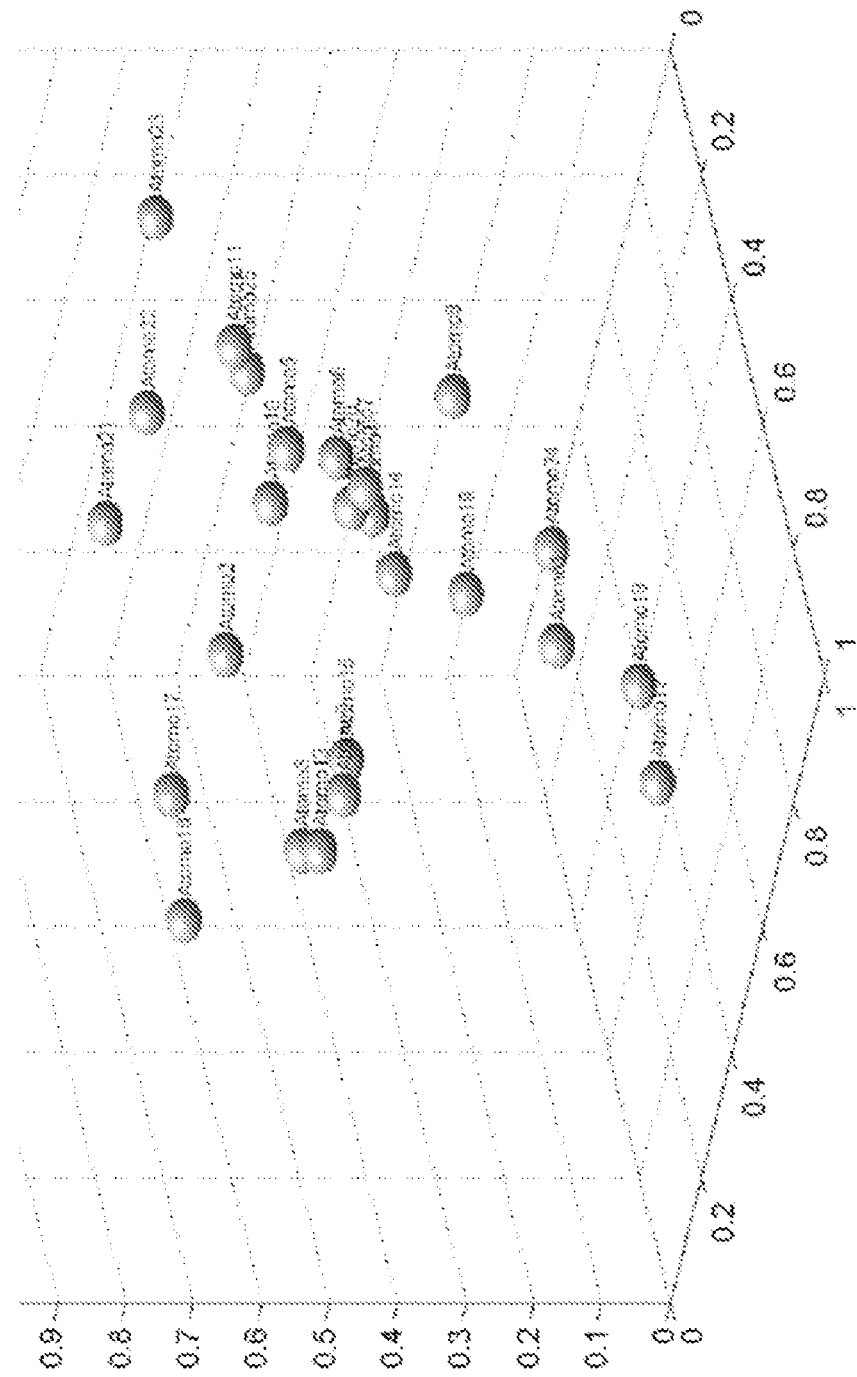

As a next step the algorithm according to the invention and to the previous description for generating a map either in a two dimensional or in a three dimensional space is applied to the database. The results are shown in FIGS. 18 e 19, respectively for the two and for the three dimensional map. In several experiments a fitness score and an error of the generated maps relatively to the experimental data in the database of the measured distances has been calculated. Fitness scores in the range of 0.96 to 0.98 has been reached. Relating to the error, two kinds of errors has been computed according to the below listed equations: ERROR 1 being defined as $$\sum_i \text{abs}(DistI_i - DistR_i)$$

and ERROR 2 being defined as $$\sum_i \frac{\text{abs}(DistI_i - DistR_i)}{DistR_i}$$

were ERROR 1 is the sum of the absolute value of the difference of the euclidean distances in the computed map $DistI_j$ and the measured distances of the database $DistR_j$ and were ERROR2 is the sum of the absolute values of difference of the percentual error of the euclidean distances in the computed map $DistI_j$ relatively to the measured distances of the database $DistR_j$.

It has to be noticed that any variant of the algorithm described above also in combination with different examples can be used. In the present case the drawing of two dimensional or three dimensional molecular maps, these means the relative location as a projection in a two dimensional or in a three dimensional space, of the atoms of a molecule is a problem which is analogous to the one of drawing a geographical map described in the previous examples.

Starting from this reasoning a further improvement of the method for determining the structure of a molecule can also provide the steps of defining one or more virtual or hypothetic atoms hereinafter indicated as hidden atoms, which might exist in the structure of the molecule but have not been determined experimentally. This further step or improvement is analogous of the one of the hidden city in the mapping example, were the city of AREZZO was introduced in the database without giving any distance value from other cities. Thus carrying out the method according to the present example, the algorithm will consider this one or more atoms and indicate them in the map. The hidden atoms can be highlighted in the structural map of the molecule determined by the present method. As a result the method will provide for a prediction of the coordinates and/or of the distances of this one or more hidden atoms in the structure of the molecule form the other atoms and the results can be used for deeper and more specific experimental inspections and structural analysis of the molecule which are aimed to verify the real existence of this one or more predicted hidden atoms.

From this point of view the present method is thus alternatively also a method for carrying out an analysis of the structure of a molecule and for predicting the existence of further atoms in the molecule. Please consider that the virtual molecule of the example has only 25 atoms which is a very low number of atoms if one considers organic chemistry or biochemistry were very big macromolecules are studied which have a much greater number of atoms.

From a general point of view the method for determining the structure of a molecule or a geographic map or for inspecting the structure of a molecule or a geographic map in order to investigate about the presence of a further "hidden" element and to predict its position relatively to the other known elements of the structure of the molecule or of a map can be considered as a general method for generating maps and or a general method for predicting the existence of an hypothetical element of the map which is not apparent and which position relatively to the other elements is not known.

A further example of this method supporting its general principle is the generation of sky maps or star maps and the prediction of the existence of a star or another astronomical object and its position relatively to other astronomical objects based on data relating to the relative distances of a certain number of stars or other astronomical objects. This kind of inspection avoid complex computations based on the observations, measurements and evaluations of orbital perturbations of objects and can give a first indication about the probability of the presence of an astronomical object which cannot be seen or is hidden.

The present invention relates also to an apparatus having artificial intelligence being capable of evaluating data which cannot be considered having a relation or correlation and for providing a reaction behavior to environmental stimuli which is similar to the human intuition processes.

As already described, environmental data may not show a direct or explicit correlation or relation. So these data and the corresponding reaction to them of a machine having artificial intelligence may not be computable or evaluated by said machine causing the machine to enter a state of inactivity or blocking the machine. Nevertheless human beings are capable of evaluating these apparently not correlated stimuli by determining in any case a reaction to them which might be either passive or active. If one considers machines having artificial intelligence such as robots or the like which have to interact with an ambient not being created or adapted for them (for example by eliminating unnecessary stimuli for the tasks these machines have to carry out), then the skill of the robots has to increase dramatically in evaluating incoming stimuli which are disordered and which apparently have no relation or no immediate recognizable relation among them and further to the evaluation in determining which reaction has to be carried out as a response to the collected stimuli.

Thus a capacity of the machine or robot to simulate a sort of "intuitive" behaviour of human beings can be of great technical importance.

Figure 15:
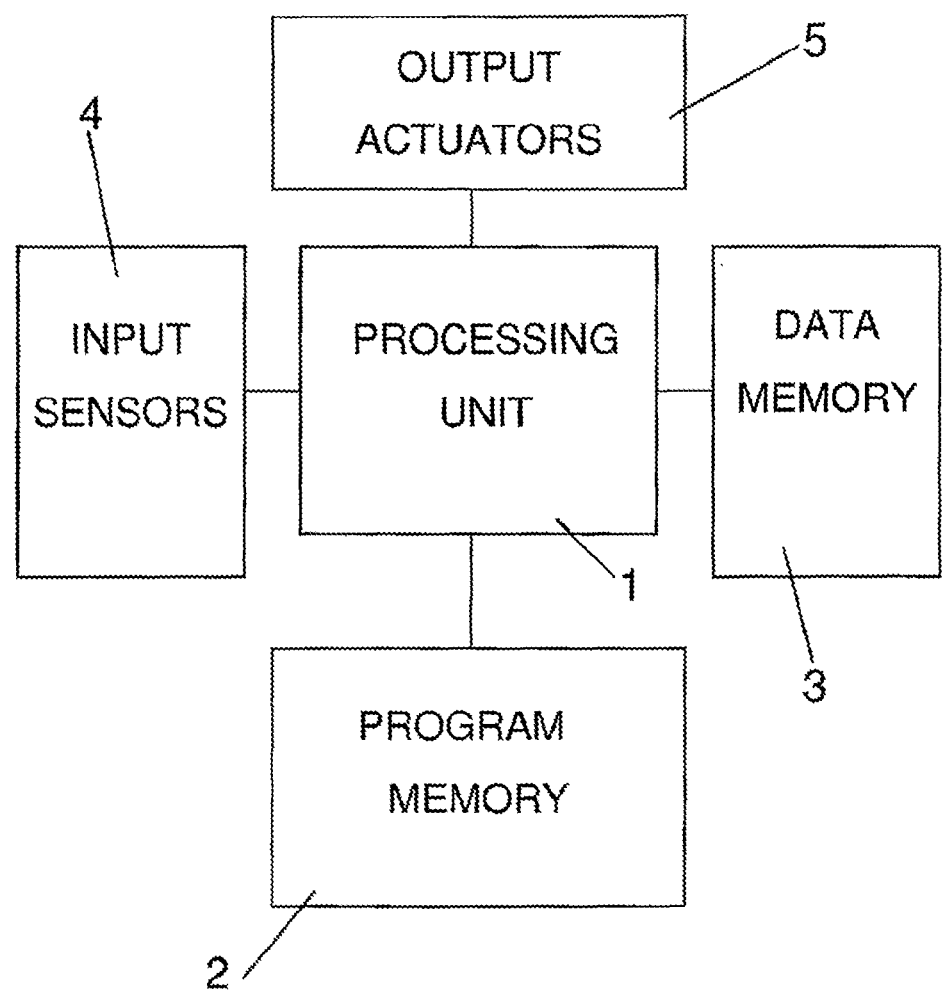
FIG. 15 is a block diagram of an apparatus according to the invention having artificial intelligence.

The apparatus according to the present invention is illustrated in FIG. 15 and comprises a processing unit 1. The processing unit can be similar to a conventional computer for the parts relating to the electronics. The housing is formed in this case by at least part of the case or of the body of the apparatus. The processing unit is associated to a memory 2 for a program running the apparatus, which program is carried out by the processing unit. A further memory 3 is provided for data which may be configuration data of the apparatus relating to input and output devices and to actuators or functional operating units or tools with which the apparatus is equipped and which are all driven by the processing unit 1. The input devices can be of different kind and are summarised by the box 4 in FIG. 15. Input devices may be different relatively to the tasks the apparatus is designed for. So in a very improved robotized apparatus such as an humanoid robot, the input device can be sensors interacting with physical and chemical stimuli such as any kind of mechanical, electric, acoustic electromagnetic or chemical stimulus. The number and kind of such sensors may vary depending on the conditions in which the apparatus has to operate. Other input devices can be provided such as input interfaces as a keyboard or reader for portable memory devices, on which data is saved which cannot be sensed directly by the apparatus by means of its sensors.

The program saved in the program memory 2 has a plurality of routines or sections each one dedicated for carrying out a certain task and a plurality of routines for driving the actuators or operating devices or units and also routines for collecting the data acquired by the sensors and feeding said data to an evaluation routine.

Figure 16:
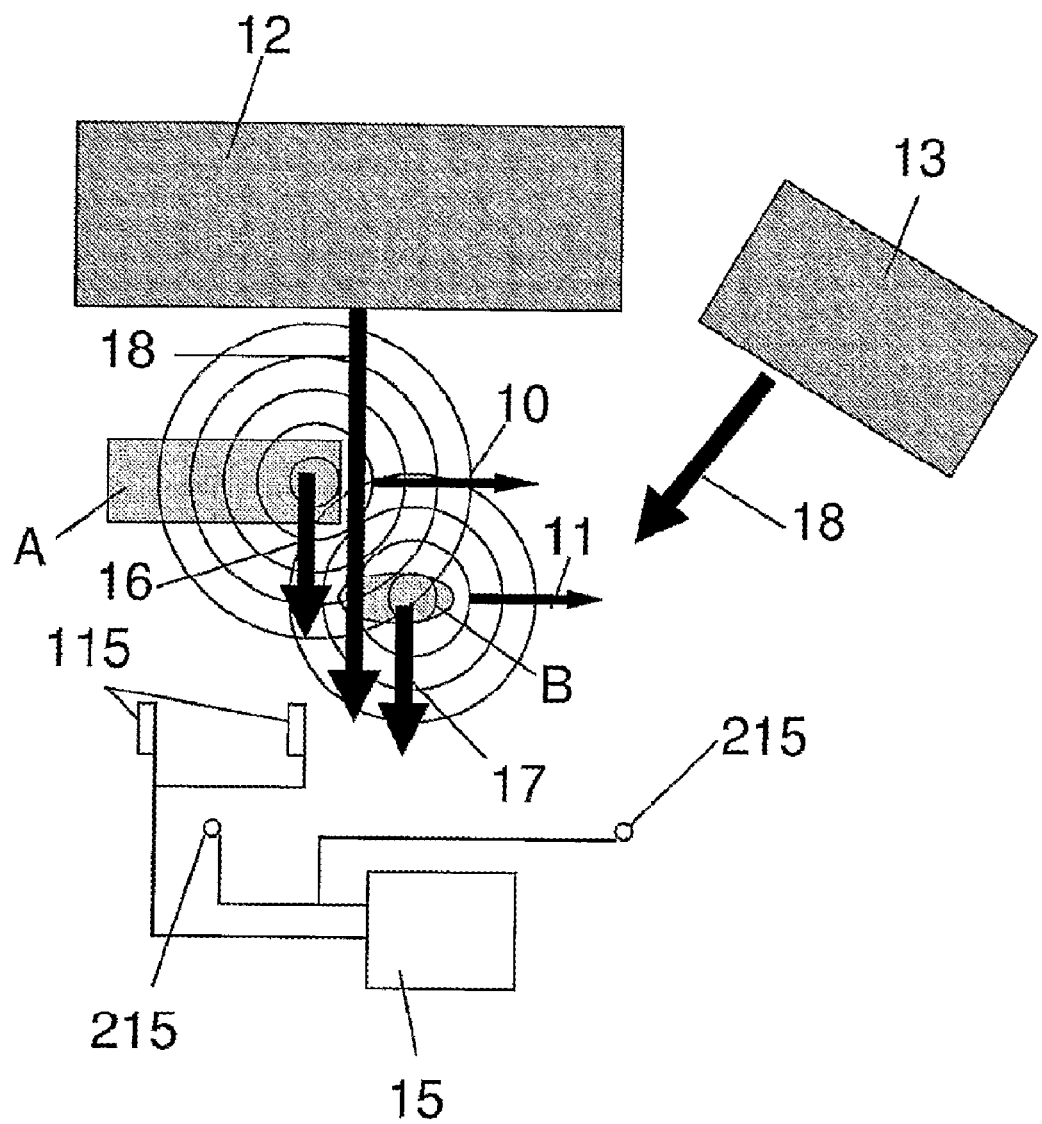
FIG. 16 is a graphic representation of an extremely simplified example of a situation where the apparatus having artificial intelligence, for example a robot, according to the invention can provide a correct response action.

If one considers a highly improved apparatus having artificial intelligence, such as a robot which must have the capacity of carrying out basic functions simulating a human being, than considering the simple situation of such an apparatus passing in a street with a normal conditions of traffic, it can be understood that the number of stimuli to which the apparatus is subjected are very high and that conditions may be present in which two stimuli of different kind having the same origin will arrive to the sensors of the apparatus in a condition in which the relation of having the same origin is not immediately or explicitly recognizable. FIG. 16 explains this condition graphically. Consider two vehicles A and B having a parallel path (indicated by the arrows 10, 11) considering a reflecting barrier on one side of the paths such as buildings 12, 13 or the like and considering also that a robotized apparatus 15 is located on the opposite side of the vehicles path as referred to the reflecting barrier.

The apparatus has two visual sensors 115, such as two cameras and two acoustic sensors 215 such as microphones. This provides for collecting three dimensional image information and three dimensional acoustic information.

The acoustic waves generated and represented by the circles will arrive directly to the apparatus as acoustic stimuli indicated by the arrows 16 and 17. These stimuli will also arrive in the form of reflected acoustic waves as indicated by the arrow 18, furthermore the direct and reflected acoustic waves of the two vehicles will also superpose or mix up.

In this condition the input data collected by the robotized apparatus 15 will provide a certain number of variables, the relation of which is not immediately and directly apparent.

Thus forming a database in which the records consist in the collected input data and carrying out the mapping algorithm according to the present invention as described before would provide a map in which the vicinity of the mapped data in the map would give to the apparatus a measure of the relation of the data one with respect to the other. Thus the apparatus is able to correctly relate the acoustic stimuli and the visual stimuli by recognizing which sound is to be associated to the vehicle A and which sound is to be associated to the vehicle B. This is evaluation step provided by the algorithm according to the invention is an analogous process as explained in the examples III, IV and V.

Furthermore considering the fact that reflected acoustic waves can be interpreted as a source of acoustic waves, by providing a hidden acoustic wave generator in the database, and using the algorithm of the present invention, the apparatus will be able to determine a map in which the reflectors are identified and their position and movement can be evaluated and also their relationship to the acoustic stimuli attaining to the reflected waves. Combining the mapping with the measure of relation, it could be also possible for the apparatus to identify to which one of the vehicles A or B the major component of the reflected wave has to be referred. Thus applying the method according to the present invention in the form of an algorithm which is coded in a program which is executable by a processing unit of an apparatus having artificial intelligence allows in the example described above to identify a relation between visual or image stimuli and acoustic stimuli, which relation was not directly recognizable from the stimuli sensed by the apparatus.

Although if constructing an appropriate model the above example could be solved by an equation describing the process based on the physical laws, it has to be understood that these ways of solving the problem need at least an approximated a priori knowledge of the conditions of the ambient on which the model has to be constructed, which is a very hard limitation. Furthermore in increasing the number of stimuli the problem might not be treated anymore by exact physical functions since with a very large number of variables an exact solvable computational problem may become not solvable. The apparatus according to the present invention includes at least a processing unit 1 and a program memory 2, in which a program consisting in the present algorithm is saved for being carried out by the processing unit 1, so as to provide for a data processing method according to the present invention, and would in any case avoid an a priori knowledge of the conditions of the ambient in which the apparatus is located and would obviate the necessity of generating exact mathematical models describing situations to which the apparatus may be subjected. Furthermore it would give the apparatus a possibility to operate also when it is subjected to a high number of stimuli.

The processing unit carries out the algorithm according to the present invention in the form of an executable program and generates the output map and the vicinity values as parameters related to the shared information as defined in the above description of the preceding examples. This output is evaluated and used as input for decisional programs which drive the functions of the actuators of the apparatus. It is also possible to provide learning programs for saving the event as experience of the apparatus, thus refining the further computational tasks.

The invention claimed is:

1. A computerized method for projecting information data from a multidimensional space onto a space having fewer dimensions, comprising:

receiving a database of N-dimensional data in the form of records having a certain number of variables;

defining a metric function for calculating a distance between each record and all the other records in the database;

calculating a matrix of distances between each record and all the other records in the database using said metric function;

defining a N−1 dimensional space in which each record is defined by N−1 coordinates;

calculating the N−1 coordinates of each record in the N−1 dimensional space using an evolutionary algorithm applied to all the records in the database at the same time;

defining a best projection of the records onto the N−1 dimensional space as a projection in which a distance matrix between each record and all the other records in the N−1 dimensional space best fits or has minimum differences with the distance matrix of the records calculated in the N-dimensional space, and outputting said best projection of the records to a user, wherein said receiving, defining, calculating and outputting are performed by a data processor, and wherein said evolutionary algorithm comprises combinatory criteria that include marriages, causing two parent records to combine their sets of data, and mutations, causing erroneous self-replications of records, wherein at least a number of marriages and of mutations of individuals are adaptive self-definable internal variables, wherein a hidden point is defined which corresponds to a hidden record or to a hidden variable whose existence is only guessed at, said hidden point is added to the parent population by giving it position coordinates $X_{hi}$ and $Y_{hi}$ in the projection, and wherein the calculation of the evolutionary algorithm is carried out in parallel with and without the hidden point and wherein best fit projections obtained from said two parallel calculations are compared.

2. The method of claim 1, wherein the database of N-dimensional data already contains data as to distances between the records.

3. The method of claim 1, wherein said evolutionary algorithm is a genetic algorithm.

4. The method of claim 1, further comprising:

encoding each individual record or variable as a point having coordinates X and Y;

defining a global set of different X and Y coordinates for each point forming a first population of projections solution onto the lesser dimensional space;

calculating a fitness score for each of the projections of the first population by using as a fitness function the matrix of distances of the single points in the original N-dimensional space;

subjecting the population of projections to combination according to certain combinatorial rules to produce a first generation population of projections which comprises X and Y coordinates for the points which are a combination of the coordinates provided in two projections of the parent generation; and calculating the fitness score of the projections of the first generation and forming a new generation basing on said first generation.

5. The method of claim 3, wherein the genetic algorithm is the Genetic Doping Algorithm.

6. The method of claim 1, further comprising:
providing a database comprising at least two records, each record having a certain number of variables;
elaborating the database alternatively or in parallel:
in a first manner in which the records are considered as being points and the variables as the coordinates of the points; and
in a second manner in which the variables are considered as being points and the records as the coordinates of the points.

7. The method of claim 1, further comprising operating on the database in a pre-processing or post-processing phase.

8. The method of claim 7, wherein the database is processed in a preventive stage by means of a Self Organizing Map algorithm, and wherein the clusters formed by this algorithm in the different units are projected to said lesser dimensional space.

9. The method of claim 1, implemented as a set of computer executable instructions saved on a removable computer readable storage medium.

10. An apparatus having artificial intelligence provided with a processing unit, said processing unit connected to a data memory and to a program memory, wherein:
the processing unit is further connected to one or more different sensors for detecting or measuring different physical and/or chemical conditions or effects or processes characterizing or occurring in an environment;
the processing unit is further connected to data input means via a service person or a data input line from other data collecting apparati;
the processing unit is also connected to means for carrying out mechanical, physical or chemical actions;
in the program memory a program executable by the processing unit being loaded which program has a routine for driving the sensors and saving in a uniquely recognizable way each datum collected by the sensors and/or for saving data input by a service person or by other apparati, driver for activating or deactivating the means for carrying out mechanical, physical or chemical actions;
the program stored in the program memory further comprising means for evaluating the data collected by the sensors and/or the data inputted by a service person or by other apparati;
wherein the program includes a subroutine for executing an algorithm implementing the method of claim 1 on the collected and/or inputted data.

11. The apparatus of claim 10, wherein the program is provided with a subroutine for carrying out a cognitive analysis of multidimensional data by treating the said data with a method for projecting information data belonging to a multidimensional space into a space having fewer dimensions comprising the following steps:
providing a database of N-dimensional data in the form of records having a certain number of variables;
defining a metric function for calculating a distance between all of the record of the database from one another;
calculating a matrix of distances between each record of the database via the metric function defined at the previous step;
defining a N−1 dimensional space in which each record is defined by N−1 coordinates;
calculating the N−1 coordinates of each record in the N−1 dimensional space with an evolutionary algorithm applied to all the records in the database at the same time; and
defining as the best projection of the records onto the N−1 dimensional space the projection in which the distance matrix of the records in the N−1 dimensional space best fits or has minimum differences with the distance matrix of the records calculated in the n-dimensional space.

12. The apparatus of claim 11, wherein said database already contains the distances between the records.

13. The apparatus according to claim 11, wherein said evolutionary algorithm is a genetic algorithm.

14. The apparatus according to claim 11, wherein said subroutine provides for:
encoding each individual record or variable represented by a point having coordinates X and Y;
defining a global set of different X and Y coordinates for each point forming a first population of projections solution onto the less dimensional space, usually a two or three dimensional space;
calculating the fitness score for each of the projections of this first population by using as the fitness function the matrix of distances of the single points in the originally N dimensional space;
subjecting the population of projections to combination according to certain combination rules thus producing a first generation population of projections which comprises X and Y coordinates for the points which are a combination of the coordinates provided in two projections of the parent generation; and
calculating the fitness score of the projections of the first generation and forming again a new generation basing on the first generation.

15. The apparatus according to claim 11, wherein the genetic algorithm is the GenD algorithm.

16. The apparatus according to claim 11, wherein a hidden point can be defined which corresponds to a hidden record or to a hidden variable whose existence is only speculative, and wherein said hidden point is added in the parent population by giving it positional coordinates $X_{hidden}$ and $Y_{hidden}$ in the projection.

17. The apparatus according to claim 11, wherein the calculation of the evolutionary algorithm is carried out in parallel with the hidden point and without the hidden point and the best fit projections obtained by the two parallel calculations are compared.

18. The apparatus according to claims 11, further comprising:
providing a database comprising a certain number of records each one characterized by a certain number of variables;
elaborating the database alternatively or in parallel according to:

a first manner in which the records are considered as being points and the variables as being the coordinates of the points; and a second manner in which the variables are considered as being points and the records are the coordinates.

19. The apparatus according to claim 11, further comprising a different treatment of the data as a pre or post processing phase.

20. The apparatus according to claim 19, wherein the data is processed in a preventive step by means of a Self Organizing Map (SOM) algorithm, the clusters formed by said SOM algorithm in the different units then being projected onto said space of fewer dimensions.

21. The apparatus according to claim 10, wherein a relationship between the collected data records of the collected data is determined via the distance of each data record from the other data records and wherein said distance is used as a relevance weight for each data record in determining the activation or deactivation of one or more of the means for carrying out mechanical, physical and/or chemical actions.

22. The apparatus according to claim 21, wherein a maximum distance for each data record from the other is set for discriminating the data records to be used in determining the activation or deactivation of one or more of the means for carrying out said mechanical, physical and or chemical actions.

23. The apparatus according to claim 21, wherein the clustering or distance of the data records on the map onto which the database has been projected is used as a measure of similarity of the data records or of the variables related to the data records.

24. A computerized method for the cognitive analysis of multidimensional information data, comprising:

receiving a database with a certain number of records, each record comprising a certain number of variables and is relative to a N-dimensional space;

projecting the database onto a space having a lesser number of dimensions relative to the N-dimensional space, considering the records as points and the variables as coordinates, or the variables as points and the records as coordinates;

carrying out said projection using an algorithm for projecting information data belonging to a multidimensional space into a space having lesser dimensions by:

calculating a matrix of distances between each point defined by a record or a variable of the database and each other point using a metric function;

defining a N−1 dimensional space in which each point represented by a record or a variable is defined by N−1 coordinates;

calculating the N−1 coordinates of each point in the N−1 dimensional space using an evolutionary algorithm applied to all the points in the database at the same time; and generating a best projection in which the distance matrix of the points in the N−1 dimensional space best fits or has minimum differences with the distance matrix of the points calculated in the N-dimensional space as the best projection of said points onto the N−1 dimensional space; and outputting said best projection to a user, wherein said receiving, projecting and carrying out are performed by a data processor, wherein said evolutionary algorithm comprises combinatory criteria that includes marriages, causing two parent records to combine their sets of data, and mutations, causing erroneous self-replications of records, wherein at least a number of marriages and of mutations of individuals are adaptive self-definable internal variables, wherein a hidden point represented by a hidden record or a hidden variable can be defined, which corresponds to a hidden point on the map and whose existence is only guessed at, said hidden point is added to the parent population by giving it position coordinates $X_{hi}$ and $Y_{hi}$ in the protection, and wherein the calculation of the evolutionary algorithm is carried out in parallel, with and without the hidden point, and best fit projections obtained from said two parallel calculations are compared.

25. The method of claim 24 wherein the database already contains distances between the records.

26. The method of claim 24, wherein the evolutionary algorithm is a genetic algorithm.

27. The method of claim 26, wherein the evolutionary algorithm is the GenD algorithm.

28. The method of claim 24, wherein said analysis:

encodes each individual record or variable as a point having coordinates X and Y;

defines a global set of different X and Y coordinates for each point forming a first population of projections solution onto the less dimensional space;

calculates a fitness score for each of the projections of this first population by using the matrix of distances of the single points in the original N-dimensional space as a fitness function;

combines the population of projections according to certain combinatorial rules to produce a first generation population of projections which comprises X and Y coordinates for the points which are a combination of the coordinates provided in two projections of the parent generation;

calculates a fitness score of the projections of the first generation; and forms a new generation based on the first generation.

29. The method of claim 24, further comprising:

providing a database comprising a certain number of records each one having a certain number of variables;

elaborating the database alternatively or in parallel according to:

a first manner by which the records are considered as being points and the variables as being the coordinates of the points; and a second manner by which the variables are considered as being points and the records are the coordinates.

30. The method of claim 24, further comprising using a different algorithm to operate on the database in a pre-processing or a post-processing phase.

31. The method of claim 30, wherein the database is processed in a preventive stage by means of a Self Organizing Map (SOM) algorithm, and wherein the clusters formed by said SOP algorithm in the different units are projected onto said lesser dimensional space.

32. The method of claim 24, wherein the distance of the points on the map onto which the database has been projected is used as a measure of similarity of the records or variables related to said points.

33. The method of claim 24, wherein:

a database is provided comprising a certain number of records, each record related to a certain number of variables;

complementary variables to the variables originally provided are added to the database;

the integrated database is projected onto a lesser dimensional space; and the distance between each variable and its complementary variable in said mapping is used as a measure of the relevance of said variable in the database.

34. The method of claim 24, wherein said method is used to evaluate the relevance of certain variables in determining a certain pathological status of individuals, and to define prototypes of individuals relative to the variables of the database and their probability of developing a certain disease.

35. The method of claim 34, where said method is used to analyze the probability of an individual of having or developing Alzheimer's.

36. The method of claim 24, implemented as a set of computer executable instructions saved on a removable computer readable storage medium.

37. The method of claim 24, wherein said method is used to generate two dimensional maps of geographic sites starting from a database comprising relative distances between the sites.

38. The method of claim 24, wherein said method is used to represent a structure of a molecule in a three dimensional or two dimensional space by indicating only the relative distances of the atoms of the molecule.

39. The method of claim 38, wherein a further preprocessing or post-processing phase is provided.

40. The method of claim 39, wherein in a preventive phase the known distance data matrix is subjected to treatment by means of a Self Organizing Map (SOM) algorithm, the clusters formed by said SOM algorithm in the different units being then processed according to said method.

41. A computerized method for generating two or three dimensional maps of geographic sites starting from a database containing relative distances between the sites, comprising:

organizing the known or measured distance values between each of the geographical sites and all the other geographical sites in a matrix form;

defining a two or a three dimensional space in which the position of each site is uniquely defined by two or three coordinates;

determining the positional coordinates of each geographical site in the two or three dimensional space using an evolutionary algorithm applied to the entire database at the same time;

determining the distances of the geographical sites one from the other using the calculated two or three dimensional positional coordinates of said geographical sites one from the other;

generating a matrix of distances with distance values determined according to the preceding step;

defining as the best set of two or three dimensional coordinates of position of the totality of the geographical sites in the two or three dimensional space, the two or three dimensional coordinates of position of the said geographical sites for which the distance matrix determined therefrom best fits or has a minimum difference with the distance matrix of the known or measured distance values of the geographical sites; and outputting said best set of coordinates of position to a user, wherein said organizing, defining, determining and outputting are performed by a data processor, wherein said evolutionary algorithm comprises combinatory criteria that include marriages, causing two parent records to combine their sets of data, and mutations, causing erroneous self-replications of records, wherein at least a number of marriages and of mutations of individuals are adaptive self-definable internal variables, wherein at least one hidden or hypothetical geographical site is added to the database of geographical sites of which neither the coordinates nor the distances are known and wherein a first and a second set of coordinates for said at least one geographical site are freely defined, and wherein the calculation of the evolutionary algorithm is carried out in parallel for the database with and without the hidden or hypothetical geographical site, and wherein the best fit set of positional coordinates of the totality of geographical sites obtained by said two parallel calculations are compared.

42. The method of claim 41, wherein the evolutionary algorithm is a genetic algorithm.

43. The method of claim 41, wherein:
a) for each geographical site a first and a second set of coordinates defining the position of each geographical site in the two or three dimensional space is calculated;
b) a fitness score of the matrix of distances among the entirety of the geographical sites determined via the first and second set of coordinates defining the position of each geographical site in the two or three dimensional space is calculated by using as a fitness function the matrix of the known or measured distances of the geographical sites;
c) the first and second set of coordinates of position of each geographical site are combined for each geographical site according to predetermined combination rules, thus producing at least a new first and second set of coordinates of position for each geographical site;
d) a fitness score of the said new first and second set of coordinates of position according to (b) is calculated; and
e) said new first and second set of coordinates of position are further combined according to (c), and (c) through (e) are repeated until at least one new first or second set of positional coordinates reaches a maximum fitness score or is greater than a minimum predefined fitness score.

44. The method of claim 43, wherein for each combination of at least one first and one second set of coordinates several new sets of coordinates are obtained by the combinations of the said at least first and second set of coordinates.

45. The method of claim 41, wherein an additional preprocessing or post-processing phase is provided.

46. The method according to claim 45, wherein in a preventive phase the known distance data matrix is subjected to treatment by means of a Self Organizing Map (SOM) algorithm, and wherein the clusters formed by said SOM algorithm in the different units are then projected into said lesser dimensional space.

47. A computerized method for representing the structure of a molecule in a three dimensional or two dimensional space by indicating only the relative distances of at least part of the atoms of the molecule relative to one another, comprising:
a) organizing known or measured distance values of all of the atoms from one another in a matrix form;
b) defining a two or a three dimensional space in which the position of each atom is uniquely defined by two or three coordinates;
c) determining the two or three coordinates of the position in the two or three dimensional space of each atom with an evolutionary algorithm applied to all of the atoms at the same time;

d) determining the distances of each of the atoms one from all of the other atoms through the calculated two or three dimensional coordinates of position of the atoms one from the other;

e) generating a matrix of distances with distances determined according to (d); and f) defining as the best set of coordinates two or three dimensional coordinates of position of the totality of the atoms in the two or three dimensional space, the two or three dimensional coordinates of position of the atoms for which the distance matrix determined therefrom best fits, or has a minimum difference, with the distance matrix of the known or measured distance values of the atoms; and g) outputting said best set of co-ordinates to a user, wherein said organizing, defining, determining, generating and outputting are performed by a data processor, wherein said evolutionary algorithm comprises combinatory criteria that include marriages, causing two parent records to combine their sets of data, and mutations, causing erroneous self-replications of records, wherein at least a number of marriages and of mutations of individuals are adaptive self-definable internal variables, wherein at least one hidden or hypothetical atom is added to a database of geographical sites of atoms of the molecule of which neither the coordinates nor the distances are known and a first and a second set of coordinates for said at least one atom are freely defined, and wherein the calculation of the evolutionary algorithm is carried out in parallel for the database provided with and without the at least one hidden or hypothetical atom and the best fit set of coordinates of position of the totality of the atoms obtained by the two parallel calculations and compared.

48. The method of claim 47, wherein the evolutionary algorithm is a genetic algorithm.

49. The method of claim 47, wherein:

a) for each atom a first and a second set of coordinates defining the position of the atom in the two or three dimensional space is calculated;

b) a fitness score of the matrix of distances among the atoms determined via the first and second set of coordinates defining the position of each atom from each other atom in the two or three dimensional space is calculated by using the matrix of the known or measured distances between the atoms as a fitness function;

c) the first and second set of positional coordinates of each atom are combined according to predetermined combination rules, thus producing at least a new first and second set of positional coordinates for each atom;

d) a fitness score of said new first and second set of positional coordinates is calculated according to (b);

e) said new first and second set of positional coordinates are again combined according to (c); and (c) through (e) are repeated until at least one new first or second set of positional coordinates reaches a maximum fitness score or is greater than a minimum predefined fitness score.

50. The method of claim 49, wherein for each combination of at least one first and one second set of coordinates several new sets of coordinates are obtained by combining said at least first and second set of coordinates.

51. The method of claim 47, used to determine the presence and/or position of at least an unknown or hidden atom in the structure of the molecule.

52. Apparatus having artificial intelligence containing a simulation of intuitive behavior, comprising:

a computer processor connected to each of a data memory and a program memory, wherein the processor is further connected to one or more sensors for detecting or measuring different physical and/or chemical conditions or effects or processes characterizing or occurring in the environment;

wherein the processor is further connected to data input means through a service person or a data input line from other data collecting apparati;

wherein the processor is further connected to means for carrying out mechanical, physical or chemical actions;

wherein the program memory stores a program executable by the processor, said program including a routine for driving the sensors and saving in a uniquely recognizable way each datum collected by the sensors and/or for saving data input by a service person or by other apparati, driver for activating or deactivating the means for carrying out mechanical, physical or chemical actions;

wherein the program stored in the program memory further comprises means for evaluating data collected by the sensors and/or inputted by a service person or by other apparati;

and wherein in operation the apparatus:

generates from the collected and/or inputted data a database with a certain number of records each one comprising a certain number of variables, which are relative to a N-dimensional space;

projects the database considering the record as points and the variables as coordinates or the variables as points and the records as coordinates onto a space having a reduced number of dimensions relatively to the N dimensional space, said projection is carried out with an algorithm for projecting information data belonging to a multidimensional space into a space having fewer dimensions comprising:

calculating a matrix of distances between each point defined by a record or a variable of the database from each other point through a metric function;

defining a N−1 dimensional space in which each point represented by a record or a variable is defined by N−1 coordinates;

calculating the N−1 coordinates of each point in the N−1 dimensional space with an evolutionary algorithm applied to all the points in the database at the same time; and defining as the best projection of the points onto the N−1 dimensional space the projection in which the distance matrix of the points in the N−1 dimensional space best fits or has minimum differences with the distance matrix of the points calculated in the N-dimensional space, wherein said evolutionary algorithm comprises combinatory criteria that include marriages, causing two parent records to combine their sets of data, and mutations, causing erroneous self-replications of records, wherein at least a number of marriages and of mutations of individuals are adaptive self-definable internal variables, wherein a hidden point represented by a hidden record or a hidden variable is definable, which corresponds to a hidden point on the map whose existence is only speculated, and wherein said hidden point is added to the parent population by giving it positional coordinates $X_{hi}$ and $Y_{hi}$ in the protection, and wherein the calculation of the evolutionary algorithm is carried out in parallel with and without the hidden point and wherein the best fit projections obtained by the two parallel calculations are compared.

53. The apparatus of claim 52, wherein said database already contains distances between the records.

54. The apparatus of claim 52, wherein the evolutionary algorithm is a genetic algorithm.

55. The apparatus of claim 52, further comprising:
encoding each individual record or variable represented by a point having coordinates X and Y;
defining a global set of different X and Y coordinates for each point forming a first population of projections solution onto the lesser dimensional space;
calculating a fitness score for each of the projections of said first population by using as a fitness function the matrix of distances between the single points in the original N dimensional space;
combining the population of projections according to certain combinatorial rules and producing a first generation population of projections which comprises X and Y coordinates for the points which are a combination of the coordinates provided in two projections of the parent generation; and
calculating the fitness score of the projections of the first generation and forming a new generation basing on the first generation.

56. The apparatus of claim 52, wherein the evolutionary algorithm is the Genetic Doping Algorithm.

57. The apparatus of claim 52, further comprising:
providing a database comprising a certain number of records each one characterized by a certain number of variables;
elaborating the database alternatively or in parallel according to:
a first manner in which the records are considered as being points and the variables as being the coordinates of the points; and
a second manner in which the variables are considered as being points and the records are the coordinates.

58. The apparatus of claim 52, further comprising treating the database as a pre-processing or post-processing phase.

59. The apparatus of claim 58, wherein the database is processed in a preventive stage through a Self Organizing Map (SOM) algorithm, the clusters formed by said SOM algorithm in the different units being projected onto said space of lesser dimension.

60. The apparatus of claim 52, wherein the clustering or distance of the points on the map onto which the database has been projected is used as a measure of similarity of the records or of the variables related to said point.

61. The apparatus of claim 52, wherein:
a database comprising a certain number of records, each record being related to a certain number of variables, is provided;
variables complementary to the variables originally provided are added to said database and the resulting integrated database is projected onto a space of lesser dimension, particularly onto a two or three dimensional space; and
the distance in the map between each variable and its complementary variable is used as a measure of the relevance of said variable in the database.

* * * * *